(12) United States Patent
Keefer et al.

(10) Patent No.: US 7,674,539 B2
(45) Date of Patent: Mar. 9, 2010

(54) SYSTEMS AND PROCESSES FOR PROVIDING HYDROGEN TO FUEL CELLS

(75) Inventors: Bowie G. Keefer, Vancouver (CA); James A. Sawada, Vancouver (CA); Erik P. Johannes, Burnaby (CA); Surajit Roy, Burnaby (CA); Michael J. Brown, West Vancouver (CA)

(73) Assignee: Xebec Adsorption Inc., Burnaby, British Columbia (CA)

( * ) Notice: Subject to any disclaimer, the term of this patent is extended or adjusted under 35 U.S.C. 154(b) by 761 days.

(21) Appl. No.: 11/403,407

(22) Filed: Apr. 12, 2006

(65) Prior Publication Data

US 2006/0182680 A1    Aug. 17, 2006

Related U.S. Application Data

(63) Continuation of application No. 10/039,552, filed on Oct. 26, 2001, now Pat. No. 7,041,272.

(30) Foreign Application Priority Data

Oct. 27, 2000  (CA) ................................ 2324699
Oct. 27, 2000  (CA) ................................ 2324702

(51) Int. Cl.
| H01M 8/02 | (2006.01) |
| H01M 8/04 | (2006.01) |
| H01M 8/06 | (2006.01) |
| C01B 3/32 | (2006.01) |
| C01B 3/38 | (2006.01) |

(52) U.S. Cl. ........................................ 429/17; 429/26

(58) Field of Classification Search .................... 429/17, 429/19, 26
See application file for complete search history.

(56) References Cited

U.S. PATENT DOCUMENTS

| 3,094,569 A | 6/1963 | Thomas |
| 3,204,388 A | 9/1965 | Asker |
| 3,430,418 A | 3/1969 | Wagner |
| 3,513,631 A | 5/1970 | Siebert et al. |
| 3,564,816 A | 2/1971 | Batta |

(Continued)

FOREIGN PATENT DOCUMENTS

| CA | 1256038 | 6/1989 |
| CA | 2016045 | 8/1994 |
| CA | 2109055 | 2/1999 |
| CA | 2087972 | 1/2000 |
| CA | 2 287 039 A1 | 4/2000 |

(Continued)

OTHER PUBLICATIONS

Carvill et al., "Sorption Enhanced Reaction Process," *AIChE Journal* 42(10):2765-2772, 1996.

(Continued)

*Primary Examiner*—Gregg Cantelmo
(74) *Attorney, Agent, or Firm*—Klarquist Sparkman, LLP

(57) ABSTRACT

A process and system for providing a hydrogen-containing gas stream to a fuel cell anode that includes providing a hydrogen-containing gas stream that includes carbon monoxide, introducing the hydrogen-containing gas stream into a pressure swing adsorption module that includes at least one carbon monoxide-selective adsorbent to produce a purified hydrogen-containing gas stream, and introducing the purified hydrogen-containing gas stream to the fuel cell anode. The pressure swing adsorption module can also include a second adsorbent and/or catalyst. Also disclosed is a fuel cell system coupled to an internal combustion engine and a fuel cell system that utilizes fuel cell waste heat for vaporizing a hydrocarbon/water mixture.

4 Claims, 11 Drawing Sheets

U.S. PATENT DOCUMENTS

| | | | |
|---|---|---|---|
| 3,594,984 | A | 7/1971 | Toyama et al. |
| 3,636,679 | A | 1/1972 | Batta |
| 3,847,672 | A | 11/1974 | Trocciola et al. |
| 3,865,924 | A | 2/1975 | Gidaspow et al. |
| 3,866,428 | A | 2/1975 | Simonet et al. |
| 4,019,879 | A | 4/1977 | Rabo et al. |
| 4,144,037 | A | 3/1979 | Armond et al. |
| 4,153,434 | A | 5/1979 | Settlemyer |
| 4,200,682 | A | 4/1980 | Sederquist |
| 4,272,265 | A | 6/1981 | Snyder |
| 4,322,394 | A | 3/1982 | Mezey et al. |
| 4,354,859 | A | 10/1982 | Keller et al. |
| 4,406,675 | A | 9/1983 | Dangieri et al. |
| 4,452,612 | A | 6/1984 | Mattia |
| 4,530,705 | A | 7/1985 | Firey |
| 4,532,192 | A | 7/1985 | Baker et al. |
| 4,553,981 | A | 11/1985 | Fuderer |
| 4,555,453 | A | 11/1985 | Appleby |
| 4,578,214 | A | 3/1986 | Jungerhans |
| 4,587,114 | A | 5/1986 | Hirai et al. |
| 4,595,642 | A | 6/1986 | Nakanishi et al. |
| 4,685,287 | A * | 8/1987 | Takuma .................. 60/785 |
| 4,696,682 | A | 9/1987 | Hirai et al. |
| 4,702,903 | A | 10/1987 | Keefer |
| 4,726,816 | A | 2/1988 | Fuderer |
| 4,743,276 | A | 5/1988 | Nishida et al. |
| 4,758,253 | A | 7/1988 | Davidson et al. |
| 4,759,997 | A | 7/1988 | Ohyauchi et al. |
| 4,781,735 | A | 11/1988 | Tagawa et al. |
| 4,783,433 | A | 11/1988 | Tajima et al. |
| 4,790,858 | A | 12/1988 | Sircar |
| 4,801,308 | A | 1/1989 | Keefer |
| 4,816,121 | A | 3/1989 | Keefer |
| 4,914,076 | A | 4/1990 | Tsuji et al. |
| 4,917,711 | A | 4/1990 | Xie et al. |
| 4,963,339 | A | 10/1990 | Krishnamurthy et al. |
| 4,968,329 | A | 11/1990 | Keefer |
| 4,969,935 | A | 11/1990 | Hay |
| 4,988,580 | A | 1/1991 | Ohsaki et al. |
| 4,994,331 | A | 2/1991 | Cohen |
| 5,068,159 | A | 11/1991 | Kinoshita |
| 5,079,103 | A | 1/1992 | Schramm |
| 5,082,473 | A | 1/1992 | Keefer |
| 5,096,469 | A | 3/1992 | Keefer |
| 5,096,470 | A | 3/1992 | Krishnamurthy |
| 5,100,635 | A | 3/1992 | Krishnamurthy et al. |
| 5,126,310 | A | 6/1992 | Golden et al. |
| 5,133,784 | A | 7/1992 | Boudet et al. |
| 5,147,735 | A | 9/1992 | Ippommatsu et al. |
| 5,175,061 | A | 12/1992 | Hildebrandt et al. |
| 5,227,598 | A | 7/1993 | Woodmansee et al. |
| 5,234,472 | A | 8/1993 | Krishnamurthy et al. |
| 5,245,110 | A | 9/1993 | Van Dijk et al. |
| 5,246,676 | A | 9/1993 | Hay |
| 5,248,325 | A | 9/1993 | Kagimoto et al. |
| 5,256,172 | A | 10/1993 | Keefer |
| 5,256,174 | A | 10/1993 | Kai et al. |
| 5,258,571 | A | 11/1993 | Golden et al. |
| 5,271,916 | A | 12/1993 | Vanderborgh et al. |
| 5,282,886 | A | 2/1994 | Kabayashi et al. |
| 5,328,503 | A | 7/1994 | Kumar et al. |
| 5,360,679 | A | 11/1994 | Buswell et al. |
| 5,366,818 | A | 11/1994 | Wilkinson et al. |
| 5,393,326 | A | 2/1995 | Engler et al. |
| 5,411,578 | A | 5/1995 | Watson et al. |
| 5,415,748 | A | 5/1995 | Emiliani et al. |
| 5,429,665 | A | 7/1995 | Botich |
| 5,431,716 | A | 7/1995 | Ebbeson |
| 5,434,016 | A | 7/1995 | Benz et al. |
| 5,441,559 | A | 8/1995 | Petit et al. |
| 5,487,775 | A | 1/1996 | LaCava et al. |
| 5,509,956 | A | 4/1996 | Opperman et al. |
| 5,523,326 | A | 6/1996 | Dandekar et al. |
| 5,529,763 | A | 6/1996 | Peng et al. |
| 5,529,970 | A | 6/1996 | Peng |
| 5,531,809 | A | 7/1996 | Golden et al. |
| 5,543,238 | A | 8/1996 | Strasser |
| 5,593,478 | A | 1/1997 | Hill et al. |
| 5,604,047 | A | 2/1997 | Bellows et al. |
| 5,632,807 | A | 5/1997 | Tomita et al. |
| 5,645,950 | A | 7/1997 | Benz et al. |
| 5,646,305 | A | 7/1997 | Wagner et al. |
| 5,656,067 | A | 8/1997 | Watson et al. |
| 5,658,370 | A | 8/1997 | Vigor et al. |
| 5,711,926 | A | 1/1998 | Knaebel |
| 5,714,276 | A | 2/1998 | Okamoto |
| 5,766,311 | A | 6/1998 | Ackley et al. |
| 5,811,201 | A | 9/1998 | Skowronski |
| 5,827,358 | A | 10/1998 | Kulish et al. |
| 5,876,486 | A | 3/1999 | Steinwandel et al. |
| 5,891,217 | A | 4/1999 | Lemcoff et al. |
| 5,900,329 | A | 5/1999 | Reiter et al. |
| 5,917,136 | A | 6/1999 | Gaffney et al. |
| 5,925,322 | A | 7/1999 | Werth |
| 5,955,039 | A | 9/1999 | Dowdy |
| 5,958,109 | A | 9/1999 | Fuderer |
| 5,968,680 | A | 10/1999 | Wolfe et al. |
| 5,980,857 | A | 11/1999 | Kapoor et al. |
| 5,981,096 | A | 11/1999 | Hornburg et al. |
| 5,998,056 | A | 12/1999 | Divisek et al. |
| 6,022,399 | A | 2/2000 | Ertl et al. |
| 6,045,933 | A | 4/2000 | Okamoto |
| 6,048,384 | A | 4/2000 | Smolarek |
| 6,051,050 | A | 4/2000 | Keefer et al. |
| 6,056,804 | A | 5/2000 | Keefer et al. |
| 6,060,032 | A | 5/2000 | Hable et al. |
| 6,063,161 | A | 5/2000 | Keefer et al. |
| 6,074,459 | A | 6/2000 | Gingrich et al. |
| 6,077,620 | A | 6/2000 | Pettit |
| 6,090,312 | A | 7/2000 | Ziaka et al. |
| 6,106,593 | A | 8/2000 | Golden et al. |
| 6,143,057 | A | 11/2000 | Bülow et al. |
| 6,162,558 | A | 12/2000 | Borup et al. |
| 6,176,897 | B1 | 1/2001 | Keefer |
| 6,190,623 | B1 | 2/2001 | Sanger et al. |
| 6,190,791 | B1 | 2/2001 | Hornburg |
| 6,200,365 | B1 | 3/2001 | Eimer et al. |
| 6,210,822 | B1 | 4/2001 | Abersfelder et al. |
| 6,231,644 | B1 | 5/2001 | Jain et al. |
| 6,255,010 | B1 | 7/2001 | George et al. |
| 6,283,723 | B1 | 9/2001 | Milburn et al. |
| 6,293,998 | B1 | 9/2001 | Dolan et al. |
| 6,296,823 | B1 | 10/2001 | Ertl et al. |
| 6,312,843 | B1 | 11/2001 | Kimbara et al. |
| 6,319,303 | B1 | 11/2001 | Guillard et al. |
| 6,398,853 | B1 | 6/2002 | Keefer et al. |
| 6,406,523 | B1 | 6/2002 | Connor et al. |
| 6,428,915 | B1 | 8/2002 | Ban et al. |
| 6,503,299 | B2 | 1/2003 | Baksh et al. |
| 6,607,854 | B1 | 8/2003 | Rehg et al. |
| 6,692,545 | B2 | 2/2004 | Gittleman et al. |
| 6,902,602 | B2 | 6/2005 | Keefer et al. |
| 6,921,597 | B2 | 7/2005 | Keefer et al. |
| 7,041,272 | B2 * | 5/2006 | Keefer et al. .................. 423/651 |
| 2001/0047824 | A1 | 12/2001 | Hill et al. |
| 2002/0004157 | A1 | 1/2002 | Keefer et al. |
| 2002/0073845 | A1 | 6/2002 | Reddy |
| 2002/0098394 | A1 | 7/2002 | Keefer et al. |
| 2002/0104518 | A1 | 8/2002 | Keefer et al. |
| 2002/0110503 | A1 | 8/2002 | Gittleman et al. |
| 2002/0110504 | A1 | 8/2002 | Gittleman et al. |
| 2002/0112479 | A1 | 8/2002 | Keefer et al. |
| 2002/0127442 | A1 | 9/2002 | Connor et al. |
| 2002/0142198 | A1 | 10/2002 | Towler et al. |

| | | | |
|---|---|---|---|
| 2002/0142208 A1 | 10/2002 | Keefer et al. | |
| 2003/0105376 A1 | 6/2003 | Foral et al. | |
| 2003/0143448 A1 | 7/2003 | Keefer | |
| 2003/0157390 A1 | 8/2003 | Keefer et al. | |
| 2003/0200866 A1 | 10/2003 | Weyrich et al. | |
| 2004/0005492 A1 | 1/2004 | Keefer et al. | |
| 2004/0131912 A1 | 7/2004 | Keefer et al. | |
| 2005/0252374 A1 | 11/2005 | Henzler et al. | |

FOREIGN PATENT DOCUMENTS

| | | |
|---|---|---|
| CA | 2087973 | 1/2001 |
| CA | 2 325 214 A1 | 5/2001 |
| DE | 3913581 A1 | 10/1990 |
| EP | 0 143 537 A2 | 6/1985 |
| EP | 0 341 189 A1 | 8/1989 |
| EP | 0 345 908 A1 | 12/1989 |
| EP | 0 143 537 B1 | 3/1990 |
| EP | 0 490 632 A1 | 6/1992 |
| EP | 0 545 559 A2 | 6/1993 |
| EP | 0 579 289 A2 | 1/1994 |
| EP | 0 681 860 A2 | 11/1995 |
| EP | 0 681 860 A3 | 7/1996 |
| EP | 0 691 701 A1 | 10/1996 |
| EP | 0 737 648 A2 | 10/1996 |
| EP | 0 750 361 A1 | 12/1996 |
| EP | 0 751 045 A2 | 1/1997 |
| EP | 0 853 967 A2 | 7/1998 |
| EP | 1 070 531 A2 | 1/2001 |
| EP | 1 095 689 A1 | 5/2001 |
| EP | 1 172 772 A2 | 1/2002 |
| EP | 1 230 966 A1 | 8/2002 |
| GB | 2 042 365 | 9/1980 |
| JP | 58-156517 | 9/1983 |
| JP | 59-075574 A | 4/1984 |
| JP | 60124361 A * | 7/1985 |
| JP | 62-278770 | 3/1987 |
| JP | 62-170171 | 7/1987 |
| JP | 62-212211 | 9/1987 |
| JP | 62-274561 | 11/1987 |
| JP | 63-034862 | 2/1988 |
| JP | 63-034862 A | 2/1988 |
| JP | 63-166137 | 7/1988 |
| JP | 63-228572 A | 9/1988 |
| JP | 02-067966 | 3/1990 |
| JP | 04-206161 A | 7/1992 |
| JP | 05-166528 | 7/1993 |
| JP | 05-182683 | 7/1993 |
| JP | 05-200225 | 8/1993 |
| JP | 07-094200 | 7/1995 |
| JP | 08-045526 A2 | 2/1996 |
| JP | 08-131750 | 5/1996 |
| JP | 09-199154 | 7/1997 |
| JP | 09-323037 | 12/1997 |
| JP | 10-027621 A | 1/1998 |
| JP | 10-0325360 A | 12/1998 |
| JP | 11-214021 A2 | 8/1999 |
| WO | WO 94/04249 | 3/1994 |
| WO | WO 96/13871 | 5/1996 |
| WO | WO 98/29182 | 7/1998 |
| WO | WO 99/19249 A1 | 4/1999 |
| WO | WO 99/28013 | 6/1999 |
| WO | WO 99/46032 | 9/1999 |
| WO | WO 00/16425 A1 | 3/2000 |
| WO | WO 00/16880 | 3/2000 |
| WO | WO 00/76630 A1 | 12/2000 |
| WO | WO 0076628 A1 * | 12/2000 |
| WO | WO 01/47050 | 6/2001 |
| WO | WO 02/24309 A1 | 3/2002 |
| WO | WO 02/35623 A2 | 5/2002 |
| WO | WO 02/37590 | 5/2002 |
| WO | WO 02/45821 | 6/2002 |
| WO | WO 02/47797 A1 | 6/2002 |
| WO | WO 02/056400 | 7/2002 |

OTHER PUBLICATIONS

Chatsiriwech et al., "Enhancement of Catalytic Reaction by Pressure Swing Adsorption," *Catalysis Today* 20:351-366, 1994.

Ding et al., "Equilibria and Kinetics of CO2 Adsorption on Hydrotalcite Adsorbent," *Chemical Engineering Science* 55:3461-3474, 2000.

Ding et al., "Adsorption-Enhanced Steam-Methane Reforming," *Chemical Engineering Science* 55:3929-3940, 2000.

Hufton et al., "Sorption-Enhanced Reaction Process for Hydrogen Production," *AIChE Journal* 45(2):248-256, 1999.

Iyuke et al., "Application of Sn-Activated Carbon in Pressure Swing Adsorption for Purification of H2," *Chemical Engineering Science* 55:4745-4755, 2000.

Vaporciyan et al., "Periodic Separating Reactors: Experiments and Theory," *AIChE Journal* 35:831-844, 1989.

"Fuel Cells for Transportation 98," *National Laboratory Annual Progress Report*, U.S. Department of Energy, Office of Advanced Automotive Technologies, "CO Clean-up R&D," Argonne National Laboratory, pp. 33-36, 1998.

International Search Report from International Application No. PCT/CA99/00823.

International Search Report from International Application No. PCT/CA02/00368.

International Search Report from International Application No. PCT/CA2005/001014.

* cited by examiner

PRIOR ART

PRIOR ART

PRIOR ART

PRIOR ART

PRIOR ART

PRIOR ART

PRIOR ART

SYSTEMS AND PROCESSES FOR PROVIDING HYDROGEN TO FUEL CELLS

CROSS REFERENCE TO RELATED APPLICATIONS

This application is a continuation of U.S. patent application Ser. No. 10/039,552, filed Oct. 26, 2001, issued as U.S. Pat. No. 7,041,272, which claims the benefit of Canadian Patent Application No. 2,324,699, filed Oct. 27, 2000, and Canadian Patent Application No. 2,324,702, filed Oct. 27, 2000, the disclosures of which are incorporated herein by reference.

FIELD OF THE DISCLOSURE

The present disclosure relates to a fuel cell-based electrical generation system that enhances the efficiency and durability of the fuel cell.

BACKGROUND

Fuel cells provide an environmentally friendly source of electrical current. One form of fuel cell used for generating electrical power, particularly for vehicle propulsion and for smaller scale stationary power generation, includes an anode channel for receiving a flow of hydrogen gas, a cathode channel for receiving a flow of oxygen gas, and a polymer electrolyte membrane (PEM) which separates the anode channel from the cathode channel. Oxygen gas which enters the cathode, reacts with hydrogen ions, which cross the electrolyte to generate a flow of electrons. Environmentally safe water vapor is produced as a byproduct.

External production, purification, dispensing and storage of hydrogen (either as compressed gas or cryogenic liquid) requires costly infrastructure, while storing of hydrogen fuel on vehicles presents considerable technical and economic barriers. Accordingly, for stationary power generation, it is preferred to generate hydrogen from natural gas by steam reforming or partial oxidation followed by water gas shift reaction. For fuel cell vehicles using a liquid fuel, it is preferred to generate hydrogen from methanol by steam reforming or from gasoline by partial oxidation or autothermal reforming, again followed by water gas shift reaction. However, the resulting hydrogen contains contaminants, such as carbon monoxide and carbon dioxide impurities, that cannot be tolerated respectively by the PEM fuel cell catalytic electrodes in more than trace levels.

The conventional method of removing residual carbon monoxide from the hydrogen feed to PEM fuel cells has been catalytic selective oxidation, which compromises efficiency as both the carbon monoxide and a fraction of the hydrogen are consumed by low temperature oxidation, without any recovery of the heat of combustion. Palladium diffusion membranes can be used for hydrogen purification, but have the disadvantages of delivering purified hydrogen at low pressure, and also the use of rare and costly materials.

Pressure swing adsorption systems (PSA) have the attractive features of being able to provide continuous sources of oxygen and hydrogen gas, without significant contaminant levels. PSA systems and vacuum pressure swing adsorption systems (VPSA) separate gas fractions from a gas mixture by coordinating pressure cycling and flow reversals over an adsorber or adsorbent bed, which preferentially adsorbs a more readily adsorbed gas component relative to a less readily adsorbed gas component of the mixture. The total pressure of the gas mixture in the adsorber is elevated while the gas mixture is flowing through the adsorber from a first end to a second end thereof, and is reduced while the gas mixture is flowing through the adsorbent from the second end back to the first end. As the PSA cycle is repeated, the less readily adsorbed component is concentrated adjacent the second end of the adsorber, while the more readily adsorbed component is concentrated adjacent the first end of the adsorber. As a result, a "light" product (a gas fraction depleted in the more readily adsorbed component and enriched in the less readily adsorbed component) is delivered from the second end of the adsorber, and a "heavy" product (a gas fraction enriched in the more strongly adsorbed component) is exhausted from the first end of the adsorber.

Numerous copper-based, CO-selective adsorbents have been disclosed by Rabo et al (U.S. Pat. No. 4,019,879), Hirai (U.S. Pat. No. 4,587,114), Nishida et al. (U.S. Pat. No. 4,743,276), Tajima et al. (U.S. Pat. No. 4,783,433), Tsuji et al. (U.S. Pat. No. 4,914,076), Xie et al. (U.S. Pat. No. 4,917,711), Golden et al. (U.S. Pat. Nos. 5,126,310; 5,258,571; and 5,531,809), and Hable et al. (U.S. Pat. No. 6,060,032). Use of some such CO-selective adsorbents in pressure swing adsorption processes for removal or concentration of CO has been commercially established at industrial scale.

Using certain adsorbents for removing CO from reformate for PEM fuel cells has been investigated by researchers at the Argonne National Laboratory, as reported in the 1998 annual report of the Fuel Cells for Transportation Program of the U.S. Department of Energy, Office of Advanced Transportation Technologies. Bellows (U.S. Pat. No. 5,604,047) discloses using selected noble metals, and the carbides and nitrides of certain metals, as carbon monoxide adsorbents in a steam displacement purge cycle for removing CO from reformate feed to fuel cells.

However, the conventional system for implementing pressure swing adsorption or vacuum pressure swing adsorption uses two or more stationary adsorbers in parallel, with directional valving at each end of each adsorber to connect the adsorbers in alternating sequence to pressure sources and sinks. This system is cumbersome and expensive to implement due to the large size of the adsorbers and the complexity of the valving required. Further, the conventional PSA system use of applied energy inefficiently because of irreversible gas expansion steps as adsorbers are cyclically pressurized and depressurized within the PSA process. Conventional PSA systems could not be applied to fuel cell power plants for vehicles, as such PSA systems are far too bulky and heavy because of their low cycle frequency and consequently large adsorbent inventory.

Another problem is the need for air compression with a substantial mechanical parasitic load to achieve high power density and high voltage efficiency with PEM fuel cells, either in the absence of PSA in prior art fuel cell systems, or to a lesser extent with the use of PSA to increase oxygen concentration. If, as usual by the case, mechanical power is provided by an electric motor powered by the fuel cell, significant efficiency losses occur in electrical power conversion and conditioning for variable speed compressor drive, and the fuel cell stack must be substantially larger to support this parasitic load as well as the application load to which useful power is delivered. In prior art PEM fuel cell power plants for automotive and other transportation applications, approximately 20% of the gross power output of the fuel cell is diverted to the parasitic load of air compression.

Yet another problem arises in the need to provide heat for endothermic fuel processing reactions to generate low purity reformate hydrogen from hydrocarbon fuels (e.g. natural gas, gasoline or diesel fuel) or oxygenate fuels (e.g. methanol, ethanol or dimethyl ether). In the prior art, the necessary heat for steam reforming of natural gas or methanol is provided least in part by burning hydrogen provided as anode tail gas from the fuel cell. Especially in the case of methanol reforming, which can be performed at relatively low temperature, combustion of valuable hydrogen to generate such low grade heat is extremely detrimental to overall energetic efficiency.

Likewise, the necessary heat for processing heavier fuels, such as gasoline, is achieved by combusting a portion of the fuel in a partial oxidation or autothermal reforming process. Again, a portion of the high-grade fuel is consumed to upgrade the remainder of that fuel to low purity hydrogen than can be purified for use in the fuel cell. With a low temperature fuel cell, thermal efficiency of prior art fuel processing systems has been extremely low, as high grade fuel is consumed. No opportunity has been found for efficient thermal integration between a high temperature fuel processor and a low temperature fuel cell in transport applications.

Combined cycle power plants with a gas turbine cycle integrated with a fuel cell system have been disclosed. Fuel cell auxiliary power units have been proposed for automobiles and passenger railcars with internal combustion engines as primary power plants. PCT Patent Application Publication No. WO 00/16425 provides examples of how PSA units may be integrated with gas turbine power plants, or with fuel cell power plants having a gas turbine auxiliary engine.

SUMMARY OF THE DISCLOSURE

The disclosed fuel-cell-based electrical generation systems and processes address the deficiencies of the prior art fuel cell electrical generation systems. This is particularly true for purification of reformate hydrogen, energy-efficient PSA oxygen enrichment, heat recovery from the fuel cell stack and/or from combustion of hydrogen PSA tail gas, and thermal powering of air compression for the oxygen PSA and of any PSA vacuum pumping so as to minimize the size of the costly fuel cell stack while maximizing overall energetic efficiency of energy conversion from the raw fuel.

In general, the disclosed electrical current generating systems comprise a fuel cell, an oxygen gas delivery system, and a hydrogen gas delivery system. The fuel cell can include an anode channel having an anode gas inlet for receiving a supply of hydrogen gas, a cathode channel having a cathode gas inlet and a cathode gas outlet, and an electrolyte in communication with the anode and cathode channel for facilitating ion transport between the anode and cathode channel. The oxygen gas delivery system is coupled to the cathode gas inlet and delivers air or oxygen (e.g. oxygen enriched air) to the cathode channel.

The oxygen gas delivery system may simply be an air blower. However, in certain embodiments it may incorporate an oxygen pressure swing adsorption system. For example, a rotary PSA system can be used comprising a rotary module having a stator and a rotor rotatable relative to the stator, for enriching oxygen gas from air. The rotor includes a number of flow paths for receiving adsorbent material therein for preferentially adsorbing a first gas component in response to increasing pressure in the flow paths relative to a second gas component. The pressure swing adsorption system also may include compression machinery coupled to the rotary module for facilitating gas flow through the flow paths for separating the first gas component from the second gas component. Described embodiments of the PSA system include a stator having a first stator valve surface, a second stator valve surface, and plurality of function compartments opening into the stator valve surfaces. The function compartments include a gas feed compartment, a light reflux exit compartment and a light reflux return compartment.

In one variation, the compression machinery comprises a compressor for delivering pressurized air to the gas feed compartment, and a light reflux expander positioned between and fluidly coupled to the light reflux exit compartment and the light reflux return compartment. A gas recirculating compressor is coupled to the light reflux expander for supplying oxygen gas, exhausted from the cathode gas outlet, under pressure to the cathode gas inlet. As a result, energy recovered from the pressure swing adsorption system can be applied to boost the pressure of oxygen gas delivered to the cathode gas inlet.

The oxygen gas delivery system is coupled to the cathode gas inlet and delivers oxygen gas to the cathode channel. The hydrogen gas delivery system supplies purified hydrogen gas to the anode gas inlet, and may recirculate hydrogen gas from the anode gas exit back to the anode gas inlet with increased purity so as to avoid accumulation of impurities in the anode channel.

In one variant of the above-described embodiments, the oxygen gas separation system comprises an oxygen pressure swing adsorption system, the hydrogen gas separation system comprises a reactor for producing a first hydrogen gas feed from hydrocarbon fuel, and a hydrogen pressure swing adsorption system is coupled to the reactor for purifying hydrogen gas received from the first hydrogen gas feed. Hydrogen gas from the anode exit may be recirculated to the hydrogen pressure swing adsorption system as a second hydrogen gas feed. Both pressure swing adsorption systems may include a rotary module having a stator and a rotor rotatable relative to the stator. The rotor includes a number of flow paths for receiving adsorbent material therein for preferentially adsorbing a first gas component in response to increasing pressure in the flow paths relative to a second gas component. The function compartments include a gas feed compartment and a heavy product compartment.

The feed gas to the hydrogen PSA system is reformate gas or syngas, generated in alternative fuel processing methods known to the art by steam reforming (e.g. of methanol or natural gas or light hydrocarbons), or by autothermal reforming or partial oxidation ("POX") (e.g. of natural gas, gasoline or diesel fuel). The CO content of methanol reformate (generated by relatively low temperature steam reforming of methanol) is typically about 1% or somewhat less. Other fuel processors (e.g. steam methane reformers, and POX or autothermal reformers operating on any feedstock) operate at a much higher temperature, and preferably include a lower temperature water gas shift reactor stage to reduce to CO content to about 1% or less.

The reformate gas contains hydrogen plus the basic impurity components of $CO_2$, CO and water vapor. If generated by air-blown POX or autothermal reforming, the reformate gas will also contain a large inert fraction of nitrogen and argon. The fraction of inert atmospheric gases can be greatly reduced if an oxygen PSA system is used to supply the POX or autothermal reformer, either directly from the PSA, or as humid and still oxygen enriched air that has been passed through the fuel cell cathode channel, which was directly fed oxygen-enriched air from the PSA.

In one variation, the oxygen pressure swing adsorption system includes a compressor coupled to the gas feed compartment for delivering pressurized air to the gas feed compartment, and a vacuum pump coupled to the compressor for extracting nitrogen product gas from the heavy product compartment. The hydrogen reactor comprises a steam reformer, including a burner, for producing syngas, and a water gas shift reactor coupled to the steam reformer for converting some CO to hydrogen. The hydrogen pressure swing adsorption system includes a vacuum pump for delivering fuel gas from the heavy product compartment to the burner. The fuel gas is burned in the burner, and the heat generated therefrom is used to supply the endothermic heat of reaction necessary for the steam reformer reaction. The resulting reformate gas is delivered to the water gas shift reactor for removal of impurities, and then delivered as the impure hydrogen gas feed to the hydrogen pressure swing adsorption system.

In another variation, the invention includes a burner for burning fuel. The reactor comprises an autothermal reformer for producing syngas, and a water gas shift reactor coupled to the autothermal reformer for converting the syngas to the impure hydrogen gas feed. The compressor of the oxygen pressure swing adsorption system delivers pressurized air to the burner, and the heavy product gas is delivered from the hydrogen pressure swing adsorption system as tail gas to be burned in the burner. The compression machine of the oxygen pressure swing adsorption system also includes an expander coupled to the compressor for driving the compressor from hot gas of combustion emitted from the burner. The feed compressor with the expander may be on a common shaft with a motor drive, or may constitute a free rotor similar to an automotive turbocharger. The same expander or another expander may be coupled to a vacuum pump to assist the PSA process. Again, the vacuum pump with its expander may be provided as a free rotor similar to an automotive turbocharger. Heat from the burner may also be applied to preheat air and/or fuel supplied to the autothermal reformer.

Independently of whether PSA is used for oxygen enrichment, the disclosed processes and systems provide a hydrogen PSA apparatus for purifying the reformate. The hydrogen PSA may be designed to deliver high purity hydrogen, or else may be designed less stringently to achieve adequately high removal of noxious components or contaminants (harmful to the fuel cell) such as CO, $H_2S$, halogens, methanol, etc. In the latter case, the hydrogen PSA would in its first pass only achieve partial removal of less harmful constituents (e.g., $N_2$, Ar and $CO_2$). In that case, anode tail gas may be recycled to the feed end of the PSA inlet for use in a feed pressurization step, thus avoiding any need for mechanical recompression. Even when high hydrogen purity is specified for the PSA, this feature enables a small bleed from the end of the anode channel back to the feed pressurization step of the hydrogen PSA, as would be desirable for avoiding a strict dead-headed configuration with the risk of accumulation in the anode channel of any contaminant slip due to equipment imperfections or operational transient upsets.

Accordingly, a first embodiment of the disclosed processes and systems contemplates providing a hydrogen-containing gas stream that includes carbon monoxide, introducing the hydrogen-containing gas stream into a pressure swing adsorption module that includes at least one carbon monoxide-selective adsorbent to produce a purified hydrogen-containing gas stream, and introducing the purified hydrogen-containing gas stream to the fuel cell anode. A further disclosed process and system for providing a hydrogen-containing gas stream to a fuel cell anode involves introducing a hydrogen-containing feed gas stream into an adsorption module having at least a first adsorbent and at least one second material, and optionally plural materials selected from a second adsorbent, a steam reforming catalyst, and a water gas shift reaction catalyst, wherein the first adsorbent and the second adsorbent are chemically distinct and at least one of the first adsorbent or the second adsorbent preferentially adsorbs a contaminant in the hydrogen-containing feed gas stream to produce a purified hydrogen-containing gas stream.

Operating temperature of the adsorbers in the hydrogen PSA unit can be elevated well above ambient, as the reformate gas is supplied at a temperature after water gas shift of typically about 200° C., while operating temperatures of PEM fuel cells may extend from about 80° C. to about 100° C. Alternatively, the adsorbers may be operated at a lower temperature if the reformate is cooled, thus providing an opportunity for partial removal of water and any methanol vapor by condensation before admission to the hydrogen PSA unit. Advantages of operation at moderately elevated temperature are (1) reformate coolers and water condensers upstream of the hydrogen PSA can be avoided, (2) PSA removal of water vapor and $CO_2$ may be more readily achieved at moderately elevated temperature compared to ambient temperature, (3) CO can be more selectively adsorbed than $CO_2$ over Cu(I)-loaded adsorbents, particularly at elevated temperature, and (4) kinetics of CO sorption and desorption on CO-selective sorbents may be greatly enhanced at higher temperature. Consequently, in certain embodiments the operating temperature range for the adsorbers is from about 80° C. to about 200° C., and a more particular operating range is from about 100° C. to about 160° C. As used herein, "operating temperature of the adsorbers" denotes the temperature of a gas flowing through the adsorbers and/or the temperature of the adsorber beds.

The hydrogen PSA unit may be configured to support a temperature gradient along the length of the flow channels, so that the temperature at the first end of the adsorbers is higher than the temperature at the second end of the adsorbers.

Especially for low purity hydrogen with anode recycle, the hydrogen PSA may use CO-selective adsorbents with CO-complexing ions, such as Cu(I) or Ag (e.g, Ag(I)), introduced by ion exchange or impregnation into a suitable adsorbent carrier or support. Prior art CO-selective adsorbents have used a wide diversity of zeolites, alumina or activated carbon adsorbents as carriers or polymers as supports. With CO-selective adsorbents, enhanced hydrogen recovery may be achieved while tolerating some accumulation of non-CO impurities circulated through the fuel cell anode loop.

Potential problems with CO-selective adsorbents used to purify hydrogen from reformate include (1) compatibility with water vapor that may deactivate the adsorbent or cause leaching of impregnated constituents, (2) over-reduction by hydrogen, causing the CO-complexing ion to reduce to inert metallic form, and (3) relatively slow kinetics of CO-complexing as compared to physical adsorption.

The active adsorbent in the disclosed processes and systems (such as a CO-selective component) can be supported on thin adsorbent sheets, which are layered and spaced apart by spacers to define flow channels, thereby providing a high-surface-area, parallel passage support with minimal mass transfer resistance and flow channel pressure drop. With crystalline adsorbents such as zeolites, and amorphous adsorbents such as alumina gel or silica gel, the adsorbent sheet is formed by coating or in-situ synthesis of the adsorbent on a reinforcement sheet of inert material, e.g. a wire mesh, a metal foil, a glass or mineral fiber paper, or a woven or nonwoven fabric. Active carbon adsorbent may also be coated onto a reinforcement sheet of inert material, but adsorbent sheets of active carbon may also be provided as self-supporting carbon fiber paper or cloth. Adsorbers of the layered adsorbent sheet material may be formed by stacking flat or curved sheets. Alternatively, adsorbers may be a spiral roll, with the flow channels between the sheets extending from the first end of the adsorber to the second end thereof. The adsorbers generally fill the volume of the adsorber housing of the desired shape. Examples of methods and structures with packed, spirally wound adsorbents are disclosed in commonly-owned, co-pending U.S. Provisional Application No. 60/285,527, filed Apr. 20, 2001, and incorporated herein by reference. Typical thickness of the adsorbent sheet may be in the range of about 100 to about 200 microns, while flow channel spacing between the sheets may be in the range of about 50 to about 200 microns.

According to one variation of the disclosed PSA units, the adsorbent material contacting the flow channels between the first and second ends of the adsorbers may in general be selected to be different in distinct zones of the flow channels, so that the adsorbers would have a succession of zones (e.g. a first zone, a second zone, a third zone, a perhaps additional zones) with distinct adsorbents proceeding along the flow channels from the first end to the second end. As an alternative to distinct zones of adsorbents, the different adsorbents may be provided in layers or mixtures that include varying gradients of adsorbent concentrations along the gas flow path. The transition from one adsorbent to another may also be a blended mixture of the two adsorbents rather than a distinct transition. A further option is to provide a mixture of the different adsorbents that may or may not be homogeneous and such mixture may be combined with a discrete zone or zones.

In a first variant configured to deliver high purity hydrogen, the adsorbent in a first zone of the adsorbers adjacent the first end will be a desiccant to achieve bulk removal of water vapor in that first zone, the adsorbent in a second zone in the central portion of the adsorbers will be selected to achieve bulk removal of $CO_2$ and some removal of CO, and the adsorbent in a third zone of the adsorbers will be selected to achieve final removal of CO and substantial removal of any additional inert components, such as nitrogen and argon. A suitable desiccant, without limitation, for the first zone is alumina gel. A suitable adsorbent for the second zone is 13X zeolite, or 5A, or active charcoal. Suitable adsorbents for the third zone, again without limitation, may be a strongly carbon monoxide and nitrogen selective adsorbent selected from the group including but not limited to Na-LSX, Ca-LSX, Li-LSX, Li-exchanged chabazite, Ca-exchanged chabazite, Sr-exchanged chabazite. The zeolite adsorbents of this group are characterized by strong hydrophilicity, corresponding to selectivity for polar molecules. This first variant relying on physical adsorption will operate most effectively at relatively lower temperatures, unlikely to exceed much more than about 100° C. although certain adsorbents such as Ca- or Sr-exchanged chabazite would remain adequately effective for CO and $N_2$ removal at temperatures to about 150° C.

In a second similar variant also configured to deliver high purity hydrogen, the adsorbent in the second or third zone may be a more strongly carbon monoxide selective adsorbent such as a Cu(I)-exchanged zeolite. The zeolite may be, for example, be an X- or a Y-type zeolite, mordenite, or chabazite. For stability against over-reduction while contacting nearly pure hydrogen, the exchangeable ions of the zeolite may be a mixture of Cu(I) and other ions such as Na, Li, Ca, Sr, other transition group metals or lanthanide group metals. The mixed ions may also or alternatively include Ag as a minor component for enhanced CO-selectivity.

In a third variant configured to deliver at least partially purified hydrogen with CO nearly completely removed, the adsorbent in a first zone of the adsorbers adjacent the first end will be a desiccant to achieve bulk removal of water vapor in that first zone, the adsorbent in a second zone in the central portion of the adsorbers will be selected to achieve bulk removal of $CO_2$ and some removal of CO, and the adsorbent in a third zone of the adsorbers will be selected to achieve final removal of CO and partial removal of any nitrogen and argon. A suitable desiccant for the first zone, without limitation, is alumina gel. A suitable adsorbent for the second zone, again without limitation, is alumina gel impregnated with Cu(I), or active carbon impregnated with Cu(I). Suitable adsorbents for the third zone may be similar to those used in the second zone, or may be a CO— and nitrogen selective adsorbent as in the first or second variants above.

In a fourth variant configured to deliver at least partially purified hydrogen with CO nearly completely removed, the adsorbent in some or all zones of the adsorbers will be a moderately hydrophobic adsorbent selected from the group including, but not limited to, active carbon and Y-zeolite, and preferably containing Cu(I) for enhanced CO— selectivity in a zone adjacent the second end of the adsorbers.

In a fifth variant configured to deliver at least partially purified hydrogen with CO nearly completely removed, the adsorbent in some or all zones of the adsorbers will be a strongly hydrophobic adsorbent selected from the group including but not limited to silicalite and dealuminified Y-type zeolite. The hydrophobic adsorbent may preferably contain Cu(I) for enhanced CO selectivity.

In a sixth variant configured to deliver at least partially purified hydrogen with CO nearly completely removed, the adsorbent in the first or second zone of the adsorbers will include a component catalytically active at the operating temperature of that zone for the water gas shift reaction. The catalytically active component may be any known water gas shift catalyst, e.g. Cu—ZnO based catalysts. Preferably, the catalytically active component may be metal carbonyl complexes of a transition group metal or a mixture of transition group metals (e.g. Cu, Ag, Ni, Pd, Pt, Rh, Ru, Fe, Mo, etc.) inserted into the zeolite cages of, for example, an X or Y-type zeolite. A portion of the carbon monoxide sorbed onto the catalytically active component may then react with water vapor by the water gas shift reaction to generate carbon dioxide and additional hydrogen. It is known [J. J. Verdonck, P. A. Jacobs, J. B. Uytterhoeven, "Catalysis by a Ruthenium Complex Heterogenized in Faujasite-type Zeolites: the Water Gas-shift Reaction", J. C. S. Chem. Comm., pp. 181-182, 1979] that ruthenium complexes stabilized within X or Y zeolites provide greater water-gas shift catalytic activity than conventional copper based catalysts. Other water gas shift catalysts known in the art include platinum supported on ceria and transition metal carbides. Iron-chrome catalysts are used for industrial water gas shift reactions at higher temperatures.

In a seventh variant configured to deliver at least partially purified hydrogen with CO nearly completely removed, the adsorbent in the first zone of the adsorbers is an adsorbent selective at the elevated operating temperature of the first zone for carbon dioxide in preference to water vapor. Suitable such adsorbents known in the art include alkali-promoted materials. Illustrative alkali-promoted materials include those containing cations of alkali metals, such as Li, Na, K, Cs, Rb, and/or alkaline earth metals, such as Ca, St, and Ba. The materials typically may be provided as the hydroxide, carbonate, bicarbonate, acetate, phosphate, nitrate or organic acid salt compound of the alkali or alkaline earth metals. Such compounds may be deposited on any suitable substrate such as alumina. Examples of specific materials include alumina impregnated with potassium carbonate and hydrotalcite promoted with potassium carbonate. The adsorbent in the second zone of the adsorbers will include a component catalytically active at the operating temperature of that zone for the water gas shift reaction, and optionally also for a steam reforming reaction of e.g. methanol or methane. As in the sixth variant above, the catalytically active component in the second zone may be a known water gas shift or steam reforming catalyst, or may be a transition group metal dispersed in zeolite cages and reversibly forming a metal carbonyl complex at the operating temperature of the second zone. The second or preferably third zone of the adsorbers contains adsorbent with some useful working capacity for carbon monoxide and other impurity components at the operating temperature of that zone. Because carbon dioxide is strongly adsorbed in the first zone, the concentration of carbon dioxide in the second zone is maintained at a reduced level by the PSA process, while water vapor concentration remains relatively high in the second zone. Hence, in this seventh variant the water gas shift reaction equilibrium (and the steam reforming equilibrium if applicable) is continually shifted by the PSA process, which continually removes both hydrogen and carbon dioxide from the catalytically active second zone while preventing passage of carbon monoxide into the hydrogen product passing the third zone, so that essentially all carbon monoxide is consumed to generate carbon dioxide and additional hydrogen. This is an example of a PSA reactor or "sorption enhanced reactor", driving the water gas shift reaction substantially to completion while achieving adequate purification of the hydrogen.

The reforming and/or water gas shift reaction catalyst(s) described above may be included in any part of the adsorber bed, but typically are included in the section prior to removal of the water vapor since water vapor is a reactant for the reforming and water gas shift reactions.

Industrial $H_2$ PSA is normally conducted at considerably elevated pressures (>10 bara) to achieve simultaneous high purity and high recovery (~80%-85%). Fuel cell systems operating with pressurized methanol reformers or integrated with gas turbine cycles may operate at relatively high pressures. However, most PEM fuel cell systems operate at ambient to about 3 bara pressure. As feed pressure and the overall working pressure ratio of the PSA are reduced, productivity and recovery of a simple cycle deteriorate. Under given pressure conditions, use of CO-selective adsorbents should significantly improve recovery at specified product CO concentration, if hydrogen purity with respect to other impurities such as nitrogen and carbon dioxide can be relaxed.

At very low feed pressures (e.g. 2-3 bara), the $H_2$ PSA may need supplemental compression to achieve high recovery. Vacuum pumping may be used to widen the working pressure ratio, or alternatively "heavy reflux," which is recompression and recycle to the PSA feed of a fraction of its exhaust stream at full pressure. Vacuum and heavy reflux options may be combined in PSA systems for reformate purification. The heavy reflux option using 13X zeolite adsorbent, which is not particularly CO-selective achieved ~95% recovery from synthetic methanol reformate at ~3 bara feed pressure and atmospheric exhaust without vacuum pumping.

To get heavy reflux in a very low pressure PSA, the vacuum pump may be configured so that part of its flow is reinjected into the PSA feed. Extremely high hydrogen recovery can then be obtained (even at a fairly low overall pressure ratio) by pumping enough heavy reflux. The vacuum level can be traded against the mass flow of heavy reflux.

A fuel cell may be a standalone power plant, or else it may be integrated with some type of combustion engine. In the case of a standalone fuel cell, all mechanical power for air handling compression and any oxygen and/or hydrogen PSA units must be provided as electrical power by the appropriately sized fuel cell stack. In this case, tight constraints apply to the recovery level that must be achieved by the $H_2$ PSA at specified purity. In the absence of any useful export use for high grade heat, an efficient heat balance requires that the heating value of combustible waste gases ($H_2$, CO and unreacted fuel) be matched to the heat demand of the fuel processor. For a fuel cell with steam reforming (e.g. methanol or natural gas), nominal hydrogen recovery by the $H_2$ PSA has to be about 75% to 80% as the PSA tail gas is burned to heat the reformer; while for a POX or autothermal reformer, hydrogen recovery by the PSA needs to be extremely high (at least 90% to 95%) as such reformers can only use a limited amount of external combustion heat from burning PSA tail gas or fuel cell anode tail gas, e.g. for preheating feed oxygen/air and fuel reactants to the reformer.

In order to achieve high process efficiency and high recovery of the PSA units along with high overall efficiency of the fuel cell system, the hydrogen PSA tail gas may be burned in an auxiliary combustion engine to drive the air handling system compressor and any vacuum pumps for the oxygen and hydrogen PSA units. Thus, according to another presently disclosed embodiment, a process and system is described that includes providing at least one first pressure swing adsorption module that produces an oxygen-enriched gas stream, the first pressure swing adsorption module including at least one device selected from a first compressor or first vacuum pump; providing at least one second pressure swing adsorption module that produces a purified hydrogen gas stream and a separation exhaust gas stream, the second pressure swing adsorption module including at least one device selected from a second compressor or second vacuum pump; introducing the oxygen-enriched gas stream and the purified hydrogen gas stream into a fuel cell; and introducing the separation exhaust gas stream as a fuel into a combustion engine for driving at least one auxiliary device, typically selected from the first compressor, first vacuum pump, second compressor, second vacuum pump, or an electric generator.

For smaller plants, internal combustion engines may be attractive relative to gas turbine configurations. Either way, powering the compressor and vacuum pump(s) by burning tail gas avoids the cost penalty of a bigger fuel cell stack in order to run compression machinery as parasitic electrical loads. The engine exhaust heat and/or cooling jacket heat may be further recovered to preheat and vaporize fuel reactants and to provide some or all of the heat of reforming for a methanol reformer as described below in more detail.

The engine could be a reciprocator or a rotary engine. It may aspirate the hydrogen PSA tail gas directly as fuel, or else be turbocharged to pull greater vacuum from the PSA exhaust. Modern Wankel derivative engines have favourable specific displacement and power density. Thus, an auxiliary internal combustion engine could act as its own vacuum pump on tail gas being inducted directly as fuel. Some oxygen enriched tail gas from the fuel cell cathode could be fed as a supplement to intake air to make up for the heavy $CO_2$ load. In view of the hydrogen, water and carbon dioxide content of the tail gas fueling this engine, conditions are favourable for extremely low emissions of NOx and other noxious contaminants. Here, the above strict heat balance constraints on necessary hydrogen recovery to be achieved by the PSA may be relaxed in designing for most desirable technical, emissions and economic performance of the power plant because tail gas combustion can thermally power auxiliary compression loads as well as provide endothermic heat of fuel processing. The combustion engine may power all compressors and vacuum pumps for the $O_2$ PSA, along with vacuum pump and/or heavy reflux compression for the $H_2$ PSA. This auxiliary gas turbine cycle allows a heavy reflux vacuum pump and compressor to be driven by the turboexpander which expands the products of hydrogen PSA tail gas combustion. Thus, one feature of disclosed processes and systems is integration of the vacuum pump(s) with the combustion engine powered by tail gas combustion. Either single or multiple spool gas turbine configurations may be considered in connection with the combustion engine. Centrifugal or axial machines may be used as the compressors and pumps. Approaches based on integration of gas turbines and fuel cells are particularly favourable for larger power levels.

Further disclosed embodiments are directed to improved steam reforming processes (particularly methanol reforming) when coupled to a fuel cell. The conventional approach for methanol reforming is to increase the pressure of liquid reactants to an elevated pressure for vaporization and the vapor phase methanol reforming reaction. This approach enables the reactor itself to be compact, and provides driving pressure for hydrogen purification by PSA or palladium diffusion membranes.

A novel low pressure process is disclosed herein for steam methanol reforming that can get enhanced heat recovery from a low pressure fuel cell. More than 60% of the endothermic heat of steam reforming methanol is the heat of vaporization to boil the methanol and the water inputs. If the fuel cell is cooled to vaporize feed liquid fuel and water at the fuel cell stack working temperature, the system may be more efficient due to heat recovery, which liberates hydrogen to generate electricity while absorbing about 25% of the stack cooling load. A water-rich mix of 14% methanol in water boils at atmospheric pressure and 85° C. to generate a 50/50 vapor mix as required by stoichiometry, or at a modestly higher temperature with a larger excess of water in the liquid phase to obtain a small excess of steam as actually required to ensure low CO concentration. Therefore the liquid mixture of water containing a fraction of methanol may be circulated as fuel cell stack coolant, and then flash evaporated to generate a methanol-$H_2O$ vapor mix to be admitted into the reforming catalyst chamber at fuel cell system working pressure. If the fuel cell operates at less than 85° C., flash evaporation likely would be performed under vacuum or else with a higher concentration of methanol (as also desirable for antifreeze characteristics for winter conditions) so that only a fraction of the water required for methanol reforming is provided by vaporization using fuel cell stack waste heat. As higher PEM fuel cell operating temperatures are considered, this approach becomes more viable as permitting either atmospheric or higher pressure for flash evaporation, or else a larger temperature differential driving heat exchange in the stack coolant channels. Thus, there is disclosed herein a process and system that involves providing a fuel cell defining a coolant passage and an anode inlet for receiving a hydrogen-containing gas stream; mixing liquid water and a hydrocarbon fuel stream resulting in a coolant mixture; introducing the coolant mixture into the coolant passage of the fuel cell; vaporizing the coolant mixture to form a steam/fuel vapor mixture; subjecting the steam/fuel vapor mixture to reaction conditions sufficient for generating a hydrogen-containing gas stream; and introducing the hydrogen-containing gas stream into the fuel cell anode inlet.

Using stack heat recovery to boil the methanol reforming reactants is more attractive for a relatively low pressure fuel cell (e.g., operating at a pressure below about 2 bars absolute), unless the working temperature were greatly increased. If all the steam feed to the methanol reformer is generated by stack heat recovery, some mechanical compression of the reformer reactant vapor mixture generally is needed except for a very low pressure PEM fuel cell (e.g. operating at a pressure below 1.5 bars absolute). Such a very low pressure fuel cell would be expected to benefit greatly from PSA $O_2$ enrichment as enabling high power density at low total pressure. However, vacuum pumping would then be required for both the oxygen PSA and a hydrogen PSA unit, particularly to obtain high recovery of hydrogen in the hydrogen PSA.

An alternative approach within the invention is to operate the fuel cell at somewhat higher pressure (e.g. operating at a pressure of about 2 or 3 bars absolute), with the stack coolant liquid mixture of water and methanol containing a higher concentration of methanol, so that the vapor mixture thus generated contains all the methanol vapor for the methanol reformer, plus only a portion of the steam required for reforming that methanol. Supplementary steam is then generated by an alternative heat source, for example exhaust heat or cooling jacket heat from a combustion engine or turbine used to drive the feed air compressor and any vacuum pumps required to operate the PSA equipment.

In the case of a POX or autothermal gasoline fuel processor, the endothermic heat for the reforming reaction is generated by burning a portion of the fuel stream within the reforming reactor. Hence, there is at most a very limited opportunity for burning the hydrogen PSA tail gas usefully to support the reforming process (e.g. to preheat incoming air and fuel streams), because ample high grade heat is generated within POX and autothermal reformers. If there is no other use for combustion heat from burning the hydrogen PSA tail gas, the hydrogen PSA achieves extremely high hydrogen recovery (in the range of e.g. 90% to 99%) to achieve heat balance and full utilization of fuel. In the case of a methanol reformer with stack heat recovery to boil the reactants as provided above within the present invention, the hydrogen PSA would have to achieve very high hydrogen recovery (~90%) in view of the substantial heat recovery from the stack to reduce the methanol reformer heat demand.

An auxiliary combustion engine or turbine therefore is disclosed, cooperating with the fuel cell power plant to at least assist the feed air compression and any vacuum pumping loads. Tail gas from the hydrogen PSA unit is now usefully consumed as fuel for the auxiliary combustion engine or turbine, so that the necessary hydrogen recovery achieved by the PSA unit may be relaxed to the range of e.g. 70% to 90% as the heat balance and fuel utilization constraints are opened. Hence, the need for heavy reflux compression and vacuum pumping to assist the hydrogen PSA unit is reduced or eliminated. Simultaneously, the auxiliary combustion engine or turbine unloads the PSA compression and any vacuum pumping load from the fuel cell electrical output, thus reducing the size and cost of the fuel cell.

The thermally integrated combination of the auxiliary combustion engine or turbine with the fuel processor provides alternative waste heat sources for vaporizing steam directly at the reforming pressure, for heating an endothermic reactor, and for recovering exothermic heat e.g. of water gas shift. A thermally integrated design can also be configured to minimize thermal inefficiencies, e.g. of heat loss by conduction to the environment, simply by placing hot components of the fuel processor and the auxiliary heat engine within a common housing, and with components at similar operating temperatures in close adjacent proximity.

The foregoing features and advantages will become more apparent from the following detailed description of several embodiments that proceeds with reference to the accompanying figures.

DETAILED DESCRIPTION OF SEVERAL EMBODIMENTS

FIGS. 1-5

One embodiment of an oxygen-enrichment rotary PSA module for use with the described methods and systems is described below in connection with FIGS. 1-5B, but the same or similar rotary PSA module configuration could be used for hydrogen enrichment (i.e., separation) in the disclosed electrical current generating systems. As used herein, a "rotary PSA" includes, but is not limited to, either a PSA wherein the adsorbent bed rotates relative to a fixed valve face or stator or a PSA wherein the valve face or stator rotates relative to a fixed adsorbent bed.

Figure 1:
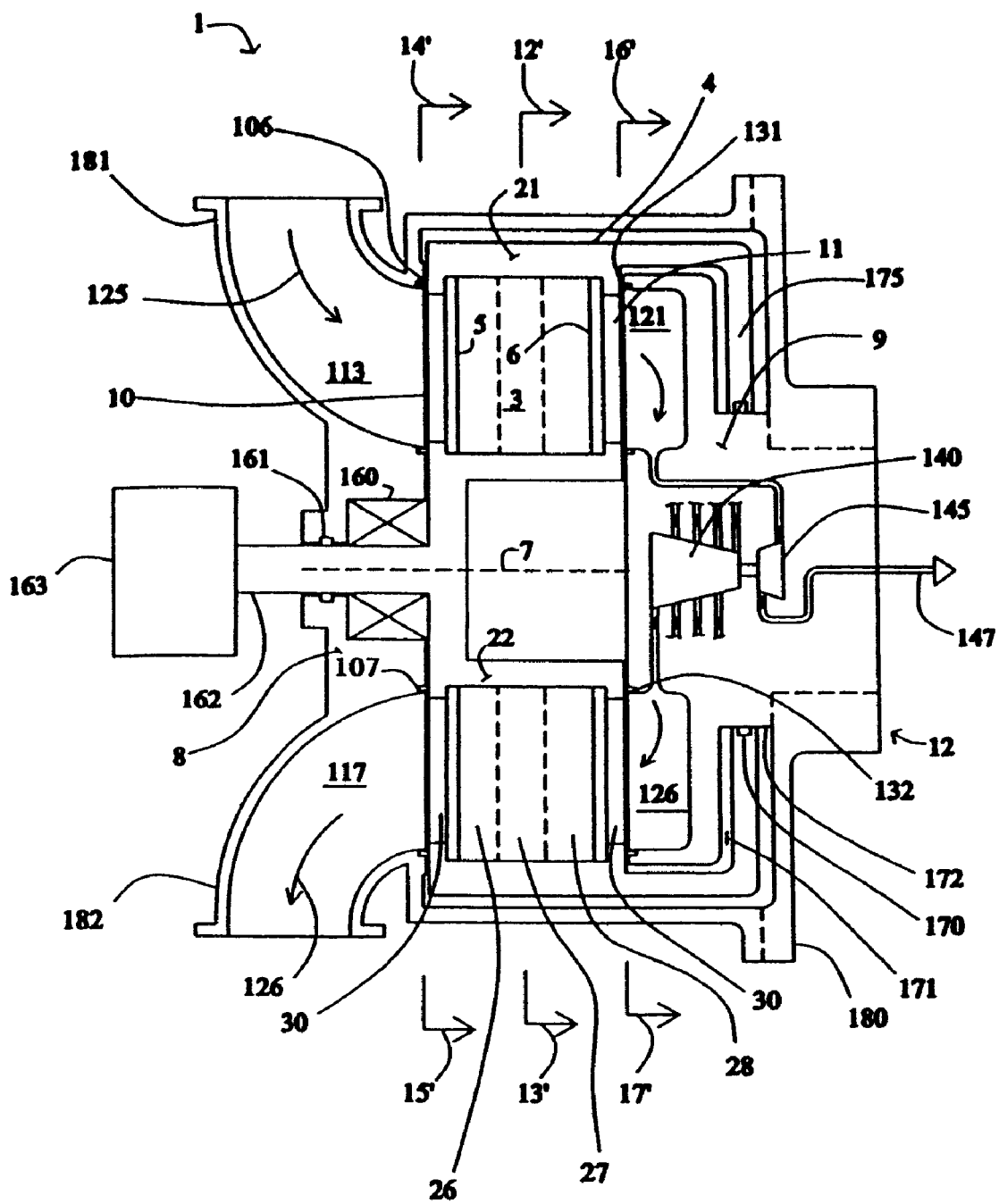
FIG. 1 shows an axial section of a rotary PSA module.

FIG. 1 shows a rotary PSA module 1, which includes a number "N" of adsorbers 3 in adsorber housing body 4. Each adsorber has a first end 5 and a second end 6, with a flow path therebetween contacting a nitrogen-selective adsorbent (for oxygen enrichment). The adsorbers are arrayed about axis 7 of the adsorber housing body. The housing body 4 is in relative rotary motion about axis 7 with first and second functional bodies 8 and 9, being engaged across a first valve face 10 with the first functional body 8 to which feed gas mixture is supplied and from which the heavy product is withdrawn, and across a second valve face 11 with the second functional body 9 from which the light product is withdrawn.

In embodiments as particularly depicted in FIGS. 1-5, the adsorber housing 4 rotates and shall henceforth be referred to as the adsorber rotor 4, while the first and second functional bodies are stationary and together constitute a stator assembly 12 of the module. The first functional body shall henceforth be referred to as the first valve stator 8, and the second functional body shall henceforth be referred to as the second valve stator 9. In other embodiments, the adsorber housing may be stationary, while the first and second function bodies may be the rotors of rotary distributor valves.

In the embodiment shown in FIGS. 1-5, the flow path through the adsorbers is parallel to axis 7, so that the flow direction is axial, while the first and second valve faces are shown as flat annular discs normal to axis 7. However, more generally the flow direction in the adsorbers may be axial or radial, and the first and second valve faces may be any figure of revolution centred on axis 7. The steps of the process and the functional compartments to be defined will be in the same angular relationship regardless of a radial or axial flow direction in the adsorbers.

Figure 2:
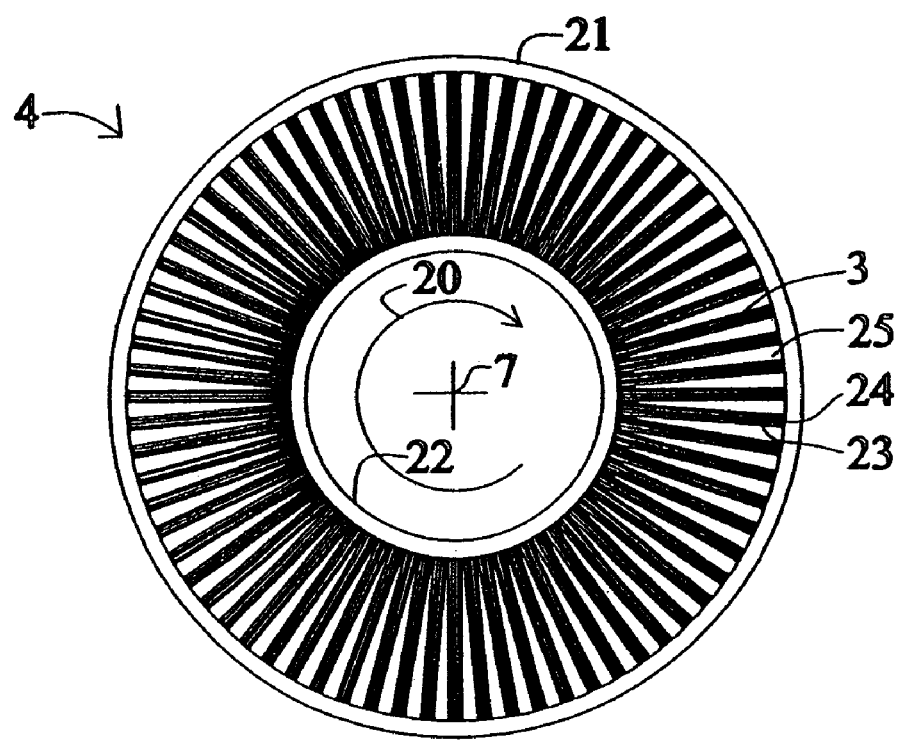
FIGS. 2 through 5B show transverse sections of the module of FIG. 1.

FIGS. 2-5 are cross sections of module 1 in the planes defined by arrows 12'-13', 14'-15', and 16'-17'. Arrow 20 in each section shows the direction of rotation of the rotor 4. FIG. 2 shows section 12'-13' across FIG. 1, which crosses the adsorber rotor. In this example, "N"=72. The adsorbers 3 are mounted between outer wall 21 and inner wall 22 of adsorber wheel 208. Each adsorber 3 comprises a rectangular flat pack of adsorbent sheets 23, with spacers 24 between the sheets to define flow channels here in the axial direction. Separators 25 are provided between the adsorbers to fill void space and prevent leakage between the adsorbers. In other configurations, the adsorbent sheets may be formed in curved packs or spiral rolls.

Satisfactory adsorbent sheets have been made by coating a slurry of zeolite crystals with binder constituents onto the reinforcement material, with successful examples including nonwoven fibreglass scrims, woven metal fabrics, and expanded aluminium foils. The adsorbent sheets comprise a reinforcement material, in preferred embodiments glass fibre, metal foil or wire mesh, to which the adsorbent material is attached with a suitable binder. For applications such as hydrogen purification, some or all of the adsorbent material may be provided as carbon fibers, in woven or nonwoven form to serve as its own reinforcement material. Spacers 24 are provided by printing or embossing the adsorbent sheet 23 with a raised pattern, or by placing a fabricated spacer between adjacent pairs of adsorbent sheets. Alternative satisfactory spacers 24 have been provided as woven metal screens, non-woven fibreglass scrims, and metal foils with etched flow channels in a photolithographic pattern.

Typical experimental sheet thicknesses have been 150 microns, with spacer heights in the range of 100 to 150 microns, and adsorber flow channel length approximately 20 cm. Using X-type zeolites, excellent performance has been achieved in oxygen separation from air and hydrogen purification from reformate at PSA cycle frequencies in the range of 1 at least to 150 cycles per minute particularly at least 25 cycles per minute.

As shown in FIG. 1, the adsorbers 3 may comprise a plurality of distinct zones between the first end 5 and the second end 6 of the flow channels. FIG. 1 illustrates a first zone 26 adjacent the first end 5, a second zone 27 in the middle of the adsorbers, and a third zone 28 adjacent the second end 6. These zones may be entirely distinct as to the local composition of adsorbent (including any catalyst), or else may be blended with a continuous gradient of adsorbent composition. Fewer or more zones may be provided as desired. The first zone typically contains an adsorbent or desiccant selected for removing very strongly adsorbed components of the feed gas mixture, such as water or methanol vapor, and some carbon dioxide. The second zone contains an adsorbent typically selected for bulk separation of impurities at relatively high concentration, and the third zone contains an adsorbent typically selected for removing impurities at relatively low concentrations.

In embodiments with multiple zones, the volume of each zone may be preselected to achieve a desired result. For example, with a 3-zone embodiment the first zone may be the first 10% to 20% of the flow channel length from the first end, the second zone may be the next roughly 40% to 50% of the channel length, and the third zone the remainder. In embodiments with only two adsorber zones, the first zone may be the first 10% to 30% of the flow channel length from the first end, and the second zone the remainder. The zones may be formed by coating the different adsorbents onto the adsorbent support sheet material in bands of the same width as the flow channel length of the corresponding zone. The adsorbent material composition may change abruptly at the zone boundary, or may be blended smoothly across the boundary. Particularly in the first zone of the adsorber, the adsorbent must be compatible with significant concentrations of water vapor.

For air separation to produce enriched oxygen, alumina gel may be used in the first zone to remove water vapor, while typical adsorbents in the second and third zones are X, A or chabazite type zeolites, typically exchanged with lithium, calcium, strontium, magnesium and/or other cations, and with optimized silicon/aluminium ratios as well known in the art. The zeolite crystals are bound with silica, clay and other binders, or self-bound, within the adsorbent sheet matrix.

In a first variant configured to deliver high purity hydrogen, the adsorbent in a first zone of the adsorbers adjacent the first end will be a desiccant to achieve bulk removal of water vapor in that first zone, the adsorbent in a second zone in the central portion of the adsorbers will be selected to achieve bulk removal of $CO_2$ and some removal of CO, and the adsorbent in a third zone of the adsorbers will be selected to achieve final removal of CO and substantial removal of any nitrogen and argon. A suitable desiccant for the first zone is alumina gel. Illustrative suitable adsorbents for the second zone are 13X zeolite, or 5A, or active charcoal. Suitable adsorbents for the third zone may be a strongly carbon monoxide and nitrogen selective adsorbent selected from the group including, but not limited to, Na-LSX, Ca-LSX, Li-LSX, Li-exchanged chabazite, Ca-exchanged chabazite, Sr-exchanged chabazite. The zeolite adsorbents of this group are characterized by strong hydrophilicity, corresponding to selectivity for polar molecules. This first variant relying on physical adsorption will operate most effectively at relatively lower temperatures, unlikely to exceed much more than about 100° C., although certain adsorbents such as Ca- or Sr-exchanged chabazite remain adequately effective for CO and $N_2$ removal at temperatures up to about 150° C.

In a second similar variant also configured to deliver high purity hydrogen, the adsorbent in the second or third zone may be a more strongly carbon monoxide selective adsorbent such as a Cu(I)-exchanged zeolite. The zeolite may for example be an X or Y-type zeolite, mordenite, or chabazite. For stability against over-reduction while contacting nearly pure hydrogen, the exchangeable ions of the zeolite may be a mixture of Cu(I) and other ions such as Na, Li, Ca, Sr, other transition group metals or lanthanide group metals. The mixed ions may also or alternatively include Ag(I) as a minor component for enhanced CO-selectivity.

In a third variant configured to deliver at least partially purified hydrogen with CO nearly completely removed, the adsorbent in a first zone of the adsorbers adjacent the first end will be a desiccant to achieve bulk removal of water vapor in that first zone, the adsorbent in a second zone in the central portion of the adsorbers will be selected to achieve bulk removal of $CO_2$ and some removal of CO, and the adsorbent in a third zone of the adsorbers will be selected to achieve final removal of CO and partial removal of any nitrogen and argon. A suitable desiccant for the first zone is alumina gel. A suitable adsorbent for the second zone is alumina gel impregnated with Cu(I), or active carbon impregnated with Cu(I). Suitable adsorbents for the third zone may be similar to those used in the second zone, or may be a CO— and nitrogen selective adsorbent as in the first or second variants above.

In a fourth variant configured to deliver at least partially purified hydrogen with CO nearly completely removed, the adsorbent in some or all zones of the adsorbers will be a moderately hydrophobic adsorbent selected from the group including but not limited to active carbon and Y-zeolite, and preferably containing Cu(I) for enhanced CO— selectivity in a zone adjacent the second end of the adsorbers.

In a fifth variant configured to deliver at least partially purified hydrogen with CO nearly completely removed, the adsorbent in some or all zones of the adsorbers will be a strongly hydrophobic adsorbent selected from the group including but not limited to silicalite and dealuminified Y-zeolite. The hydrophobic adsorbent may preferably contain Cu(I) for enhanced CO— selectivity.

In a sixth variant configured to deliver at least partially purified hydrogen with CO nearly completely removed, the adsorbent in the first or second zone of the adsorbers will include a component catalytically active at the operating temperature of that zone for the water gas shift reaction. The catalytically active component may be any water gas shift catalyst, e.g. Cu—ZnO based catalysts. Preferably, the catalytically active component may be metal carbonyl complexes of a transition group metal or a mixture of transition group metals (e.g. Cu, Ag, Ni, Pd, Pt, Rh, Ru, Fe, Mo, etc.) inserted into the zeolite cages of e.g. an X or Y zeolite. A portion of the carbon monoxide sorbed onto the catalytically active component may then react with water vapor by the water gas shift reaction to generate carbon dioxide and additional hydrogen.

In a seventh variant configured to deliver at least partially purified hydrogen with CO nearly completely removed, the adsorbent in the first zone of the adsorbers is an adsorbent selective at the elevated operating temperature of the first zone for carbon dioxide in preference to water vapor. Suitable such adsorbents known in the art include alumina impregnated with potassium carbonate, and hydrotalcite promoted with potassium carbonate. The adsorbent in the second zone of the adsorbers will include a component catalytically active at the operating temperature of that zone for the water gas shift reaction and if desired a steam reforming reaction. As in the sixth variant above, the catalytically active component in the second zone may be a known water gas shift catalyst, or may be a transition group metal dispersed in zeolite cages and reversibly forming a metal carbonyl complex at the operating temperature of the second zone. The second or preferably third zone of the adsorbers contains adsorbent with some useful working capacity for carbon monoxide and other impurity components at the operating temperature of that zone. The third zone of the adsorbers preferably contains an adsorbent with useful working capacity for water vapor at the operating temperature of that zone. Because carbon dioxide is strongly adsorbed in the first zone, the concentration of carbon dioxide in the second zone is maintained at a reduced level by the PSA process, while water vapor concentration remains relatively high in the second zone. Hence, in this seventh variant the water gas shift reaction equilibrium is continually shifted by the PSA process which continually removes both hydrogen and carbon dioxide from the catalytically active second zone while preventing passage of carbon monoxide into the hydrogen product passing the third zone, so that essentially all carbon monoxide is consumed to generate carbon dioxide and additional hydrogen. The water gas shift reaction is thus driven substantially to completion, while achieving adequate purification of the hydrogen.

The water gas shift reaction is exothermic, and consequently heat should be removed from the reactive second zone of the adsorbers in which the catalyst is contained. As disclosed in copending patent application PCT publication WO 00/76629, the disclosure of which is incorporated herein by reference, the adsorber housing may be configured as a heat exchanger so that heat may be transferred through the containment walls of the individual adsorbers. Heat may also be removed by allowing the temperature of the second zone to rise above the temperature of the first ends of the adsorbers so that heat is removed by the carbon dioxide product of reaction and by axial conduction through the preferably metallic support of the adsorbent laminate, and/or by allowing the temperature of the second zone to rise above the temperature of the second ends of the adsorbers so that heat is removed by the hydrogen product as sensible heat and by axial conduction through the preferably metallic support of the adsorbent laminate.

The above described seventh variant may be readily adapted for the important application of steam reforming methanol. The adsorbent in the first zone may be promoted hydrotalcite, which preferentially adsorbs carbon dioxide. The catalyst in the second zone may be any catalyst active for the methanol steam reforming and water gas shift reactions, e.g. Cu—ZnO or a noble metal catalyst. The adsorbent in the third zone is selective for water and methanol vapor. Consequently, the concentration of carbon dioxide is depressed, while the concentrations of steam and methanol vapor are elevated, over the second zone so as to shift the reaction equilibria for high conversion of methanol and removal of carbon monoxide by water gas shift. At a given temperature, the reaction rate will be enhanced compared to the same catalyst in a conventional reactor.

The vapor phase steam reforming reaction is endothermic, and consequently heat must be provided to the reactive second zone of the adsorbers in which the catalyst is contained. As disclosed in our copending patent application PCT publication WO 00/76629, the disclosure of which is incorporated herein by reference thereto, the adsorber housing may be configured as a heat exchanger so that heat may be transferred through the containment walls of the individual adsorbers. Heat may also be supplied by allowing the temperature of the second zone to fall below the temperature of the first ends of the adsorbers so that heat is delivered to the second zone as sensible heat of the reactants and also by axial conduction through the preferably metallic support of the adsorbent laminate from the first end of the adsorbers.

Figure 3:
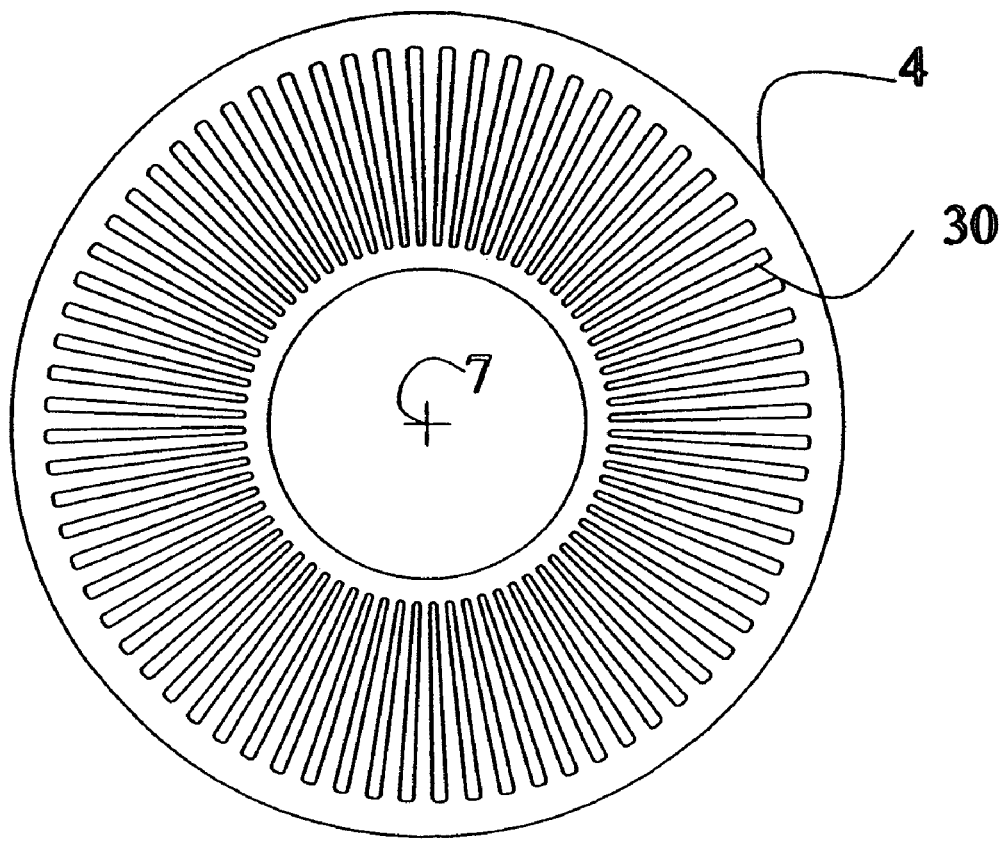

FIG. 3 shows the porting of rotor 4 in the first and second valve faces respectively in the planes defined by arrows 14'-15', and 16'-17'. An adsorber port 30 provides fluid communication directly from the first or second end of each adsorber to respectively the first or second valve face.

Figure 4A:
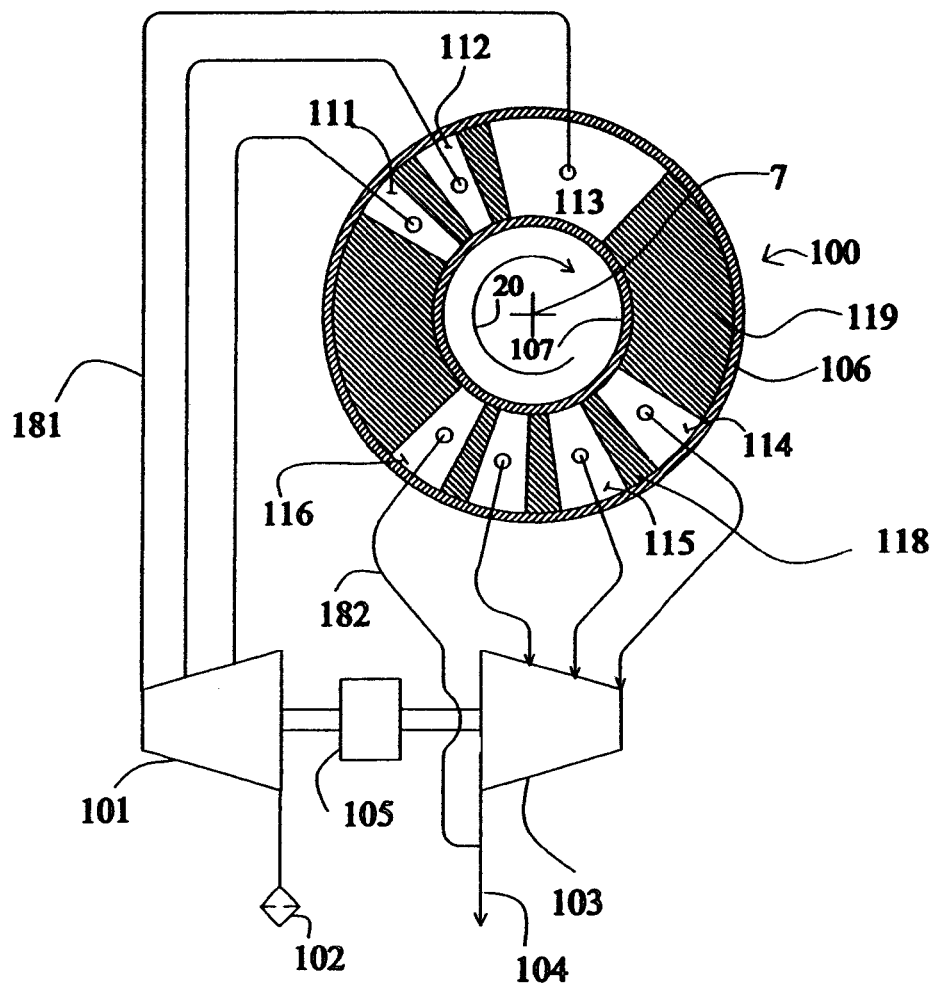
Figure 4B:
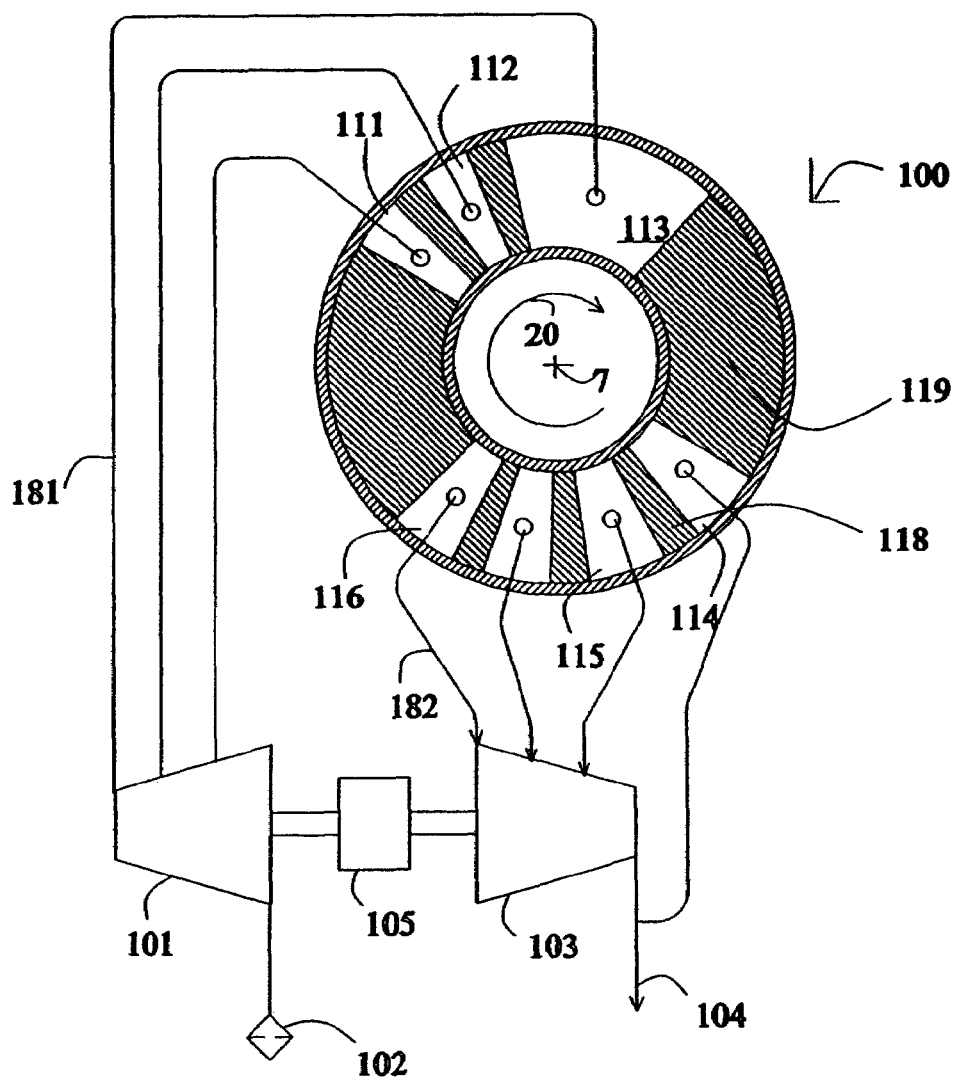

FIGS. 4A and 4B show the first stator valve face 100 of the first stator 8 in the first valve face 10, in the plane defined by arrows 14-15. Fluid connections are shown to a feed compressor 101 inducting feed gas through inlet filter 102, and to an exhauster 103 delivering second product to a second product delivery conduit 104. Compressor 101 and exhauster 103 are shown coupled to a drive motor 105.

Arrow 20 indicates the direction of rotation by the adsorber rotor. In the annular valve face between circumferential seals 106 and 107, the open area of first stator valve face 100 ported to the feed and exhaust compartments is indicated by clear angular segments 111-116 corresponding to the first functional ports communicating directly to functional compartments identified by the same reference numerals 111-116. The substantially closed area of valve face 100 between functional compartments is indicated by hatched sectors 118 and 119 which are slippers with zero clearance, or preferably a narrow clearance to reduce friction and wear without excessive leakage. Typical closed sector 118 provides a transition for an adsorber, between being open to compartment 114 and open to compartment 115. Gradual opening is provided by a tapering clearance channel between the slipper and the sealing face, so as to achieve gentle pressure equalization of an adsorber being opened to a new compartment. Much wider closed sectors (e.g. 119) are provided to substantially close flow to or from one end of the adsorbers when pressurization or blowdown is being performed from the other end.

The feed compressor provides feed gas to feed pressurization compartments 111 and 112, and to feed production compartment 113. Compartments 111 and 112 have successively increasing working pressures, while compartment 113 is at the higher working pressure of the PSA cycle. Compressor 101 may thus be a multistage or split stream compressor system delivering the appropriate volume of feed flow to each compartment so as to achieve the pressurization of adsorbers through the intermediate pressure levels of compartments 111 and 112, and then the final pressurization and production through compartment 113. A split stream compressor system may be provided in series as a multistage compressor with interstage delivery ports; or as a plurality of compressors or compression cylinders in parallel, each delivering feed air to the working pressure of a compartment 111 to 113. Alternatively, compressor 101 may deliver all the feed gas to the higher pressure, with throttling of some of that gas to and 112 at their respective intermediate pressures.

Similarly, exhauster 103 exhausts heavy product gas from countercurrent blowdown compartments 114 and 115 at the successively decreasing working pressures of those compartments, and finally from exhaust compartment 116, which is at the lower pressure of the cycle. Similarly to compressor 101, exhauster 103 may be provided as a multistage or split stream machine, with stages in series or in parallel to accept each flow at the appropriate intermediate pressure descending to the lower pressure.

In the example embodiment of FIG. 4A, the lower pressure is ambient pressure, so exhaust compartment 116 communicates directly to heavy product delivery conduit 104. Exhauster 103 thus is an expander which provides pressure letdown with energy recovery to assist motor 105 from the countercurrent blowdown compartments 114 and 115. For simplicity, exhauster 103 may be replaced by throttling orifices as countercurrent blowdown pressure letdown means from compartments 114 and 115.

In some embodiments, the lower pressure of the PSA cycle is subatmospheric. Exhauster 103 is then provided as a vacuum pump, as shown in FIG. 4B. Again, the vacuum pump may be multistage or split stream, with separate stages in series or in parallel, to accept countercurrent blowdown streams exiting their compartments at working pressures greater than the lower pressure which is the deepest vacuum pressure. In FIG. 4B, the early countercurrent blowdown stream from compartment 114 is released at ambient pressure directly to heavy product delivery conduit 104. If, for simplicity, a single stage vacuum pump were used, the countercurrent blowdown stream from compartment 115 is throttled down to the lower pressure over an orifice to join the stream from compartment 116 at the inlet of the vacuum pump.

If the feed gas is provided at an elevated pressure at least equal to the higher pressure of the PSA cycle, as may conveniently be the case of a hydrogen PSA operating with e.g. methanol reformate feed, compressor 101 would be eliminated. To reduce energy losses from irreversible throttling over orifices to supply feed pressurization compartments e.g. 111, the number of feed pressurization stages may be reduced, sot that adsorber repressurization is largely achieved by product pressurization, by backfill from light reflux steps. Alternatively, compressor 101 may be replaced in part by an expander which expands feed gas to a feed pressurization compartment, e.g. 111, from the feed supply pressure of the higher pressure to the intermediate pressure of that compartment, so as to recover energy for driving a vacuum pump 103, which reduces the lower pressure below ambient pressure so as to enhance the PSA process performance.

Figure 5A:
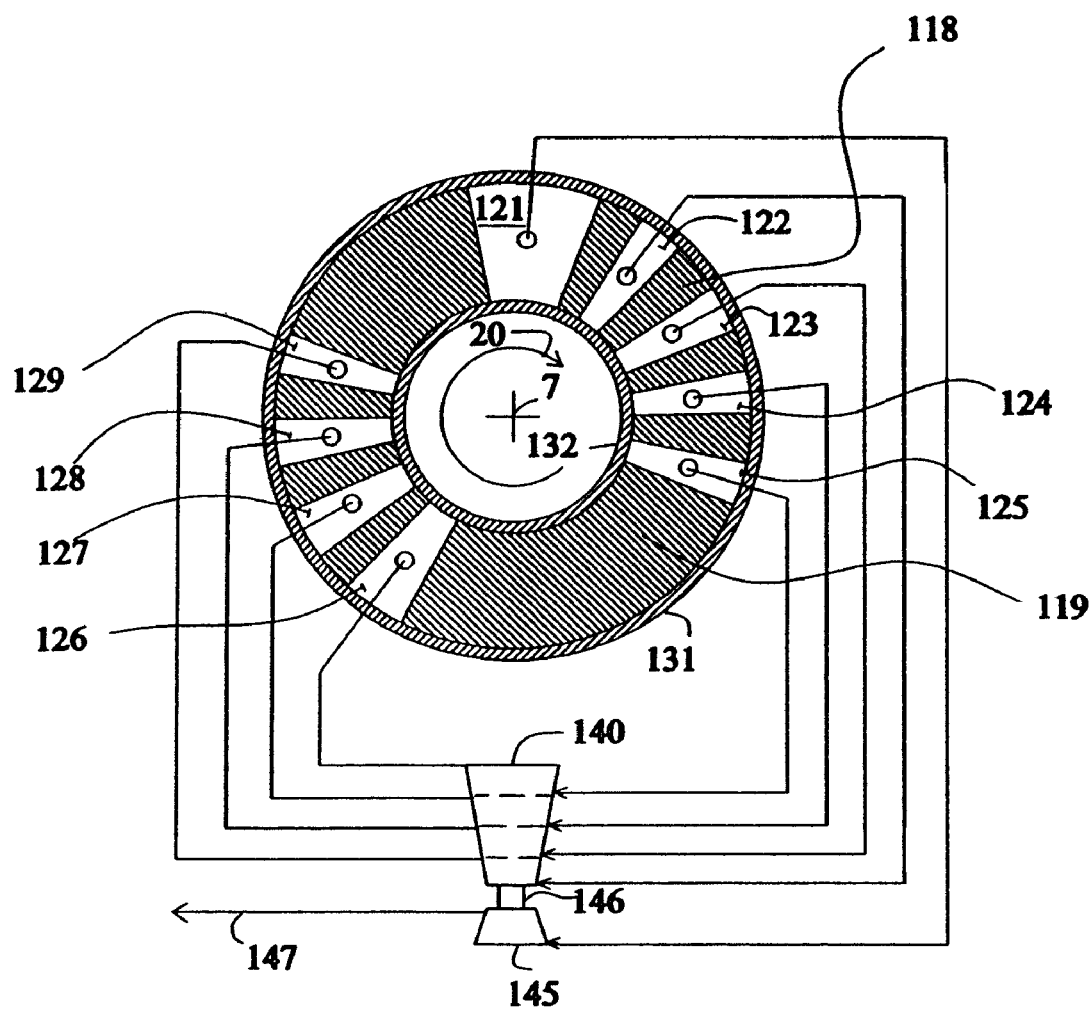
Figure 5B:
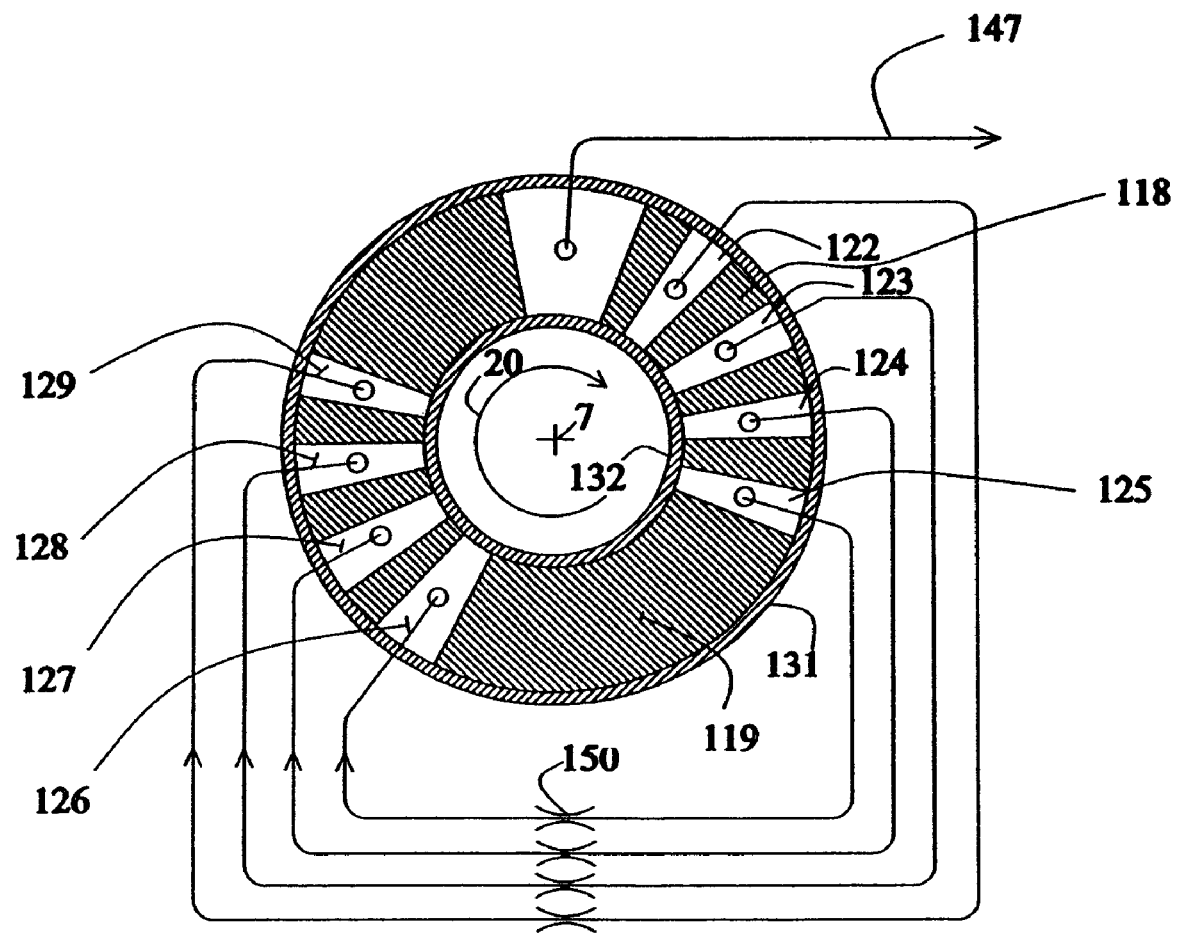

FIGS. 5A and 5B show the second stator valve face, at section 16'-17' of FIG. 1. Open ports of the valve face are second valve function ports communicating directly to a light product delivery compartment 121; a number of light reflux exit compartments 122, 123, 124 and 125; and the same number of light reflux return compartments 126, 127, 128 and 129 within the second stator. The second valve function ports are in the annular ring defined by circumferential seals 131 and 132. Each pair of light reflux exit and return compartments provides a stage of light reflux pressure letdown, respectively for the PSA process functions of supply to backfill, full or partial pressure equalization, and cocurrent blowdown to purge.

Illustrating the option of light reflux pressure letdown with energy recovery, a split stream light reflux expander 140 is shown in FIGS. 1 and 5A to provide pressure let-down of four light reflux stages with energy recovery. Light reflux expander 140 provides pressure let-down for each of four light reflux stages, respectively between light reflux exit and return compartments 122 and 129, 123 and 128, 124 and 127, and 125 and 126 as illustrated. The light reflux expander 140 may power a light product booster compressor 145 by drive shaft 146, which delivers the oxygen enriched light product to oxygen delivery conduit 147 compressed to a delivery pressure above the higher pressure of the PSA cycle.

Since the light reflux and light product have approximately the same purity, expander 140 and light product compressor 145 may be hermetically enclosed in a single housing, which may be conveniently integrated with the second stator as shown in FIG. 1. This configuration of a "turbocompressor" light product booster without a separate drive motor is advantageous, as a useful pressure boost of the light product can be achieved without an external motor and corresponding shaft seals, and can also be very compact when designed to operate at very high shaft speeds.

FIG. 5B shows the simpler alternative of using a throttle orifice 150 as the pressure letdown means for each of the light reflux stages.

Turning back to FIG. 1, compressed feed gas is supplied to compartment 113 as indicated by arrow 125, while heavy product is exhausted from compartment 117 as indicated by arrow 126. The rotor is supported by bearing 160 with shaft seal 161 on rotor drive shaft 162 in the first stator 8, which is integrally assembled with the first and second valve stators. The adsorber rotor is driven by motor 163 as rotor drive means.

As leakage across outer circumferential seal 131 on the second valve face 11 may compromise light product purity, and more importantly may allow ingress of humidity into the second ends of the adsorbers which could deactivate the nitrogen-selective or CO-selective adsorbent, a buffer seal 170 may be included to provide more positive sealing of buffer chamber 171 between seals 131 and 171. Even though the working pressure in some zones of the second valve face may be subatmospheric (in the case that a vacuum pump is used as exhauster 103), buffer chamber is filled with dry light product gas at a buffer pressure positively above ambient pressure. Hence, minor leakage of light product outward may take place, but humid feed gas may not leak into the buffer chamber. In order to further minimize leakage and to reduce seal frictional torque, buffer seal 171 seals on a sealing face 172 at a much smaller diameter than the diameter of circumferential seal 131. Buffer seal 170 seals between a rotor extension 175 of adsorber rotor 4 and the sealing face 172 on the second valve stator 9, with rotor extension 175 enveloping the rear portion of second valve stator 9 to form buffer chamber 171. A stator housing member 180 is provided as structural connection between first valve stator 8 and second valve stator 9. Direct porting of adsorbers to the stator face is an alternative to providing such seals and is described in commonly-owned, co-pending U.S. Provisional Application No. 60/301,723, filed Jun. 28, 2001, and incorporated herein by reference.

In the following system figures of this disclosure, simplified diagrams will represent a PSA apparatus or module. These highly simplified diagrams will indicate just a single feed conduit 181 to, and a single heavy product conduit 182 from, the first valve face 10; and the light product delivery conduit 147 and a single representative light reflux stage 184 with pressure let-down means communicating to the second valve face 11. Reference numerals pertaining to PSA units as described above will be unprimed for an oxygen enrichment PSA or VPSA unit, and primed for a hydrogen purification PSA or VPSA unit. Any type of gas separation device could be substituted for the PSA, including other types of adsorption modules or gas membrane separation systems, although rotary PSA systems currently are deemed preferred systems. The disclosed systems and processes also could be used with fuel cell types other than PEM fuel cells.

FIG. 6

Figure 6:
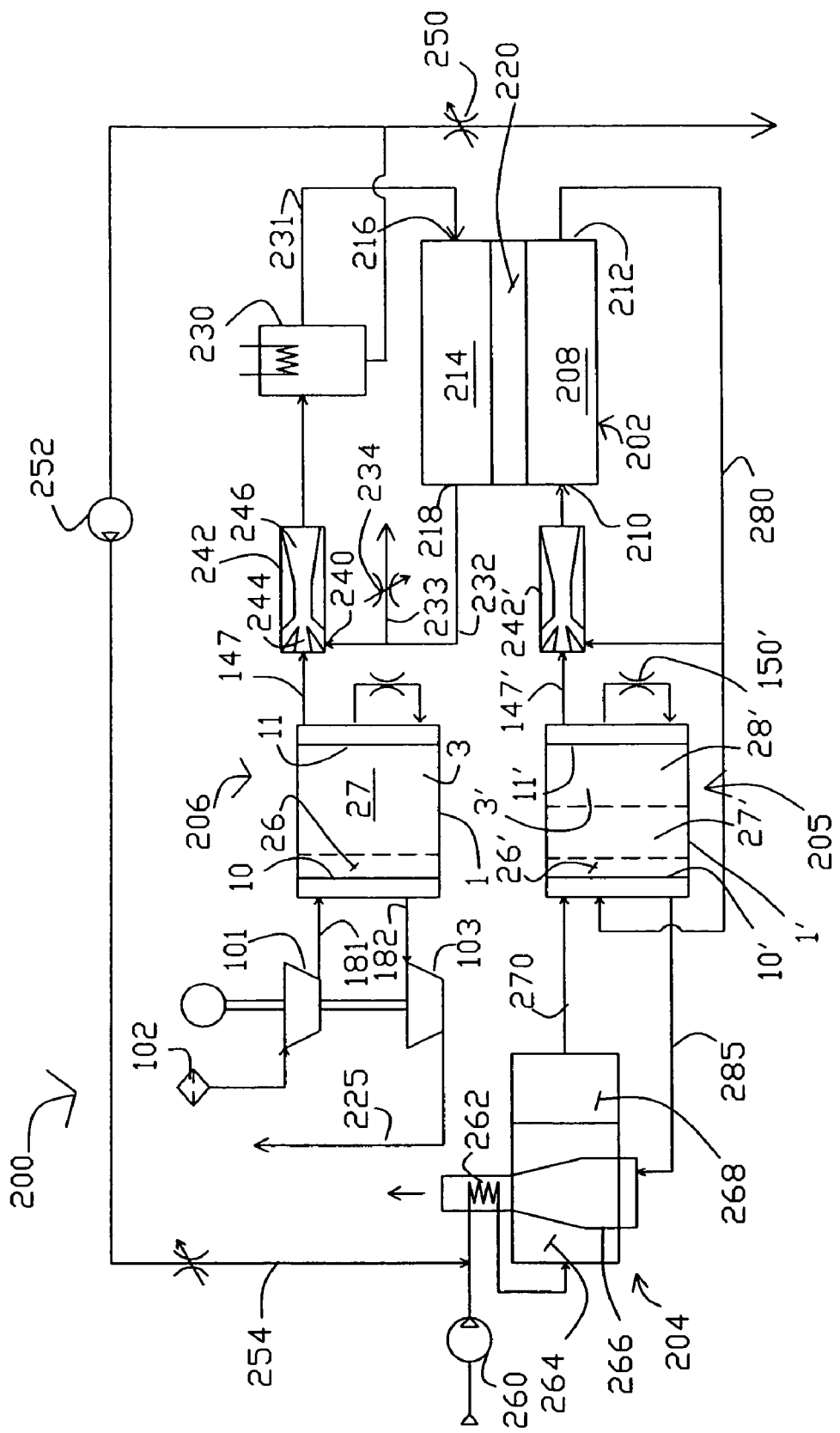
FIG. 6 is a simplified schematic of a fuel cell power plant with a steam reforming fuel processor, a PSA unit for reformate hydrogen purification by at least removal of CO, and a VPSA unit for oxygen enrichment.

FIG. 6 shows a fuel cell power plant 200 comprising a fuel cell 202, a steam reforming fuel processor 204, a hydrogen purification PSA system 205, and an oxygen enrichment VPSA system 206. Fuel cell 202 comprises an anode channel 208 including an anode gas inlet 210 and an anode gas outlet 212, a cathode channel 214 including a cathode gas inlet 216 and a cathode gas outlet 218, and a PEM electrolyte membrane 220. Membrane 220 cooperates with the anode channel 208 and the cathode channel 214 to facilitate ion exchange between the anode channel 208 and the cathode channel 214.

The oxygen VPSA system 206 extracts oxygen gas from feed air, and typically comprises a PSA rotary module 1 and a compressor 101 for delivering pressurized feed air to the feed compartments of the rotary module 1. The oxygen VPSA system 206 includes a vacuum pump 103 coupled to the compressor 101 for withdrawing nitrogen enriched gas as heavy product gas from the blowdown and exhaust compartments of the rotary module 1, and discharging the nitrogen enriched gas from conduit 225. The adsorbers 3 of rotary module 1 have a first zone 26 loaded with a suitable desiccant such as alumina gel for substantially removing water vapor, and a second zone 27 loaded with a zeolite, generally nitrogen-selective zeolite. Dry oxygen enriched air as the light product gas of VPSA module 1 is delivered by conduit 147 to water management chamber 230 for humidification, and thence by conduit 231 to cathode inlet 216. A portion of the oxygen reacts with hydrogen ions when electric current is generated, to form water in the cathode. The cathode exhaust gas now containing a reduced amount of oxygen (but still typically oxygen-enriched well above ambient air composition) is withdrawn from cathode exit 218 by conduit 232. A portion of the cathode exhaust gas is removed from conduit 232 by conduit 233 and flow control valve 234, and may either be vented to atmosphere for purging nitrogen and argon accumulations, or else returned to the first valve face 10 of PSA module 1 as a feed pressurization stream at an intermediate pressure below the higher pressure of the PSA cycle. The remaining cathode exhaust gas is supplied to suction port 240 of an ejector 242, which serves as cathode gas recirculation means. Ejector 242 receives enriched oxygen from conduit 147 through nozzle 244, which drives recirculation of cathode exhaust gas from suction port 240, mixes the enriched oxygen and recirculating cathode exhaust gas before pressure recovery in diffuser 246 and delivers the combined oxygen enriched gas stream to water management chamber 230 where excess water is condensed. The excess water is either exhausted through valve 250, or else is delivered as water reactant to fuel processor 204 by water pump 252 through conduit 254.

A hydrocarbon fuel, supplied to the fuel processor 204 by a feed pump or compressor 260, is combined with water from conduit 254, and is vaporized and preheated in heat exchanger 262. The preheated stream of fuel and steam is then admitted to steam reforming catalytic chamber 264, which is heated by burner 266 whose flue gas heats the heat exchanger 262. In the example that the fuel is methane, the following steam reforming reactions take place:

$$CH_4 + H_2O \rightarrow CO + 3H_2$$

$$CH_4 + 2H_2O \rightarrow CO_2 + 4H_2$$

The resulting reformate or "syngas" (dry composition approximately 70% $H_2$ with roughly equal amounts of CO and $CO_2$ as major impurities, and unreacted $CH_4$ and $N_2$ as minor impurities) is cooled to about 250° C., and then passed to the water gas shift reaction zone 268 for reacting most of the CO with steam to produce more $H_2$ and $CO_2$:

$$CO + H_2O \rightarrow CO_2 + H_2$$

The hydrogen rich reformate still contains about 1% to 2% CO after water gas shift, along with substantial amounts of carbon dioxide and water vapor. For high performance and longevity of a PEM fuel cell, it CO concentration should be reduced well below 100 ppm and preferably below 10 ppm. Consequently, the impure reformate is admitted by conduit 270 to the higher pressure feed port of hydrogen PSA unit 205, including rotary PSA module 1'. Adsorbers 3' of rotary module 1' have a first zone 26' loaded with a suitable desiccant, such as alumina gel, for substantial removal of water vapor, a second zone 27' loaded with an adsorbent selective for CO removal, and at least partial bulk removal of $CO_2$, and a third zone 28' loaded with an adsorbent suitable for further removal of CO and at least partial removal of other impurities, such as $N_2$. There can be numerous combinations and variations of suitable adsorbents for the three zones of the hydrogen PSA adsorbers, as already recited above. These zones may be discrete, may have diffused boundaries, or in some embodiments the materials selected for each zone may be homogeneously moved.

Purified hydrogen light product from the hydrogen PSA module 1' is delivered by conduit 147' to an ejector 242' which is a recirculation means for partial recirculation of hydrogen rich anode gas through fuel cell anode channel 208. The hydrogen rich gas from ejector 242' is delivered to anode inlet 210, passed through anode channel 208, and then exhausted from anode exit 212 in part back to the suction inlet of ejector 242'. Recirculation of anode gas through the ejector 242' is optional, so this ejector may be omitted. The remaining portion of the anode exhaust gas (or all of it in the case that ejector 242' is omitted) is conveyed by conduit 280 back to a feed pressurization port in the first valve surface 10' of hydrogen PSA module 1', so as to retain hydrogen within the system while using the hydrogen PSA unit to reject impurities from the anode gas loop. A larger fraction of anode gas is recycled in this manner back to the PSA unit when adsorbent and PSA process combinations are selected that remove CO almost completely while allowing some passage of other impurities such as $N_2$ and perhaps some $CO_2$. Conversely, only a small amount of anode exhaust gas is recycled back to the PSA to prevent inadvertent impurity accumulations, when the adsorbents and PSA cycle are designed to achieve high purity hydrogen with nearly compete removal of CO and other impurities as well.

Exhaust second product gas from the hydrogen PSA module 1' is exhausted from valve face 10' by conduit 285 to burner 266.

It will be understood by those of ordinary skill in the art that the hydrogen PSA unit of this invention, with the above specified combinations and variations of adsorbents in the sequential zones of the adsorbers, may be applied in conjunction with alternative fuel processors, including partial oxidation or autothermal reactors for processing of heavy as well as light hydrocarbon fuels to generate hydrogen rich reformate, from which CO and other impurities must be removed.

FIGS. 7-9

Figure 7:
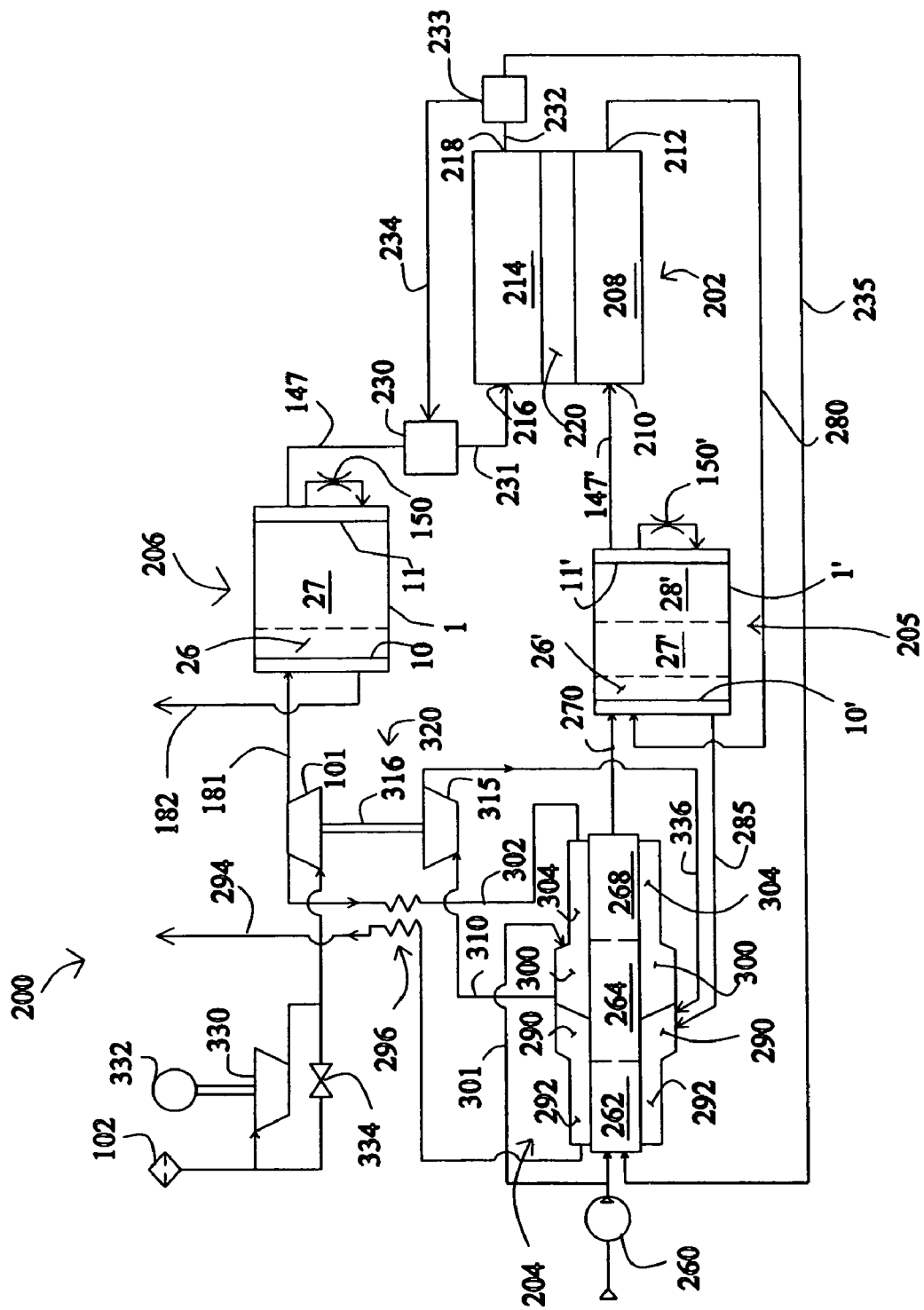
FIG. 7 is a simplified schematic of an additional embodiment of a fuel cell power plant that includes a modified steam reforming fuel processor.
Figure 8:
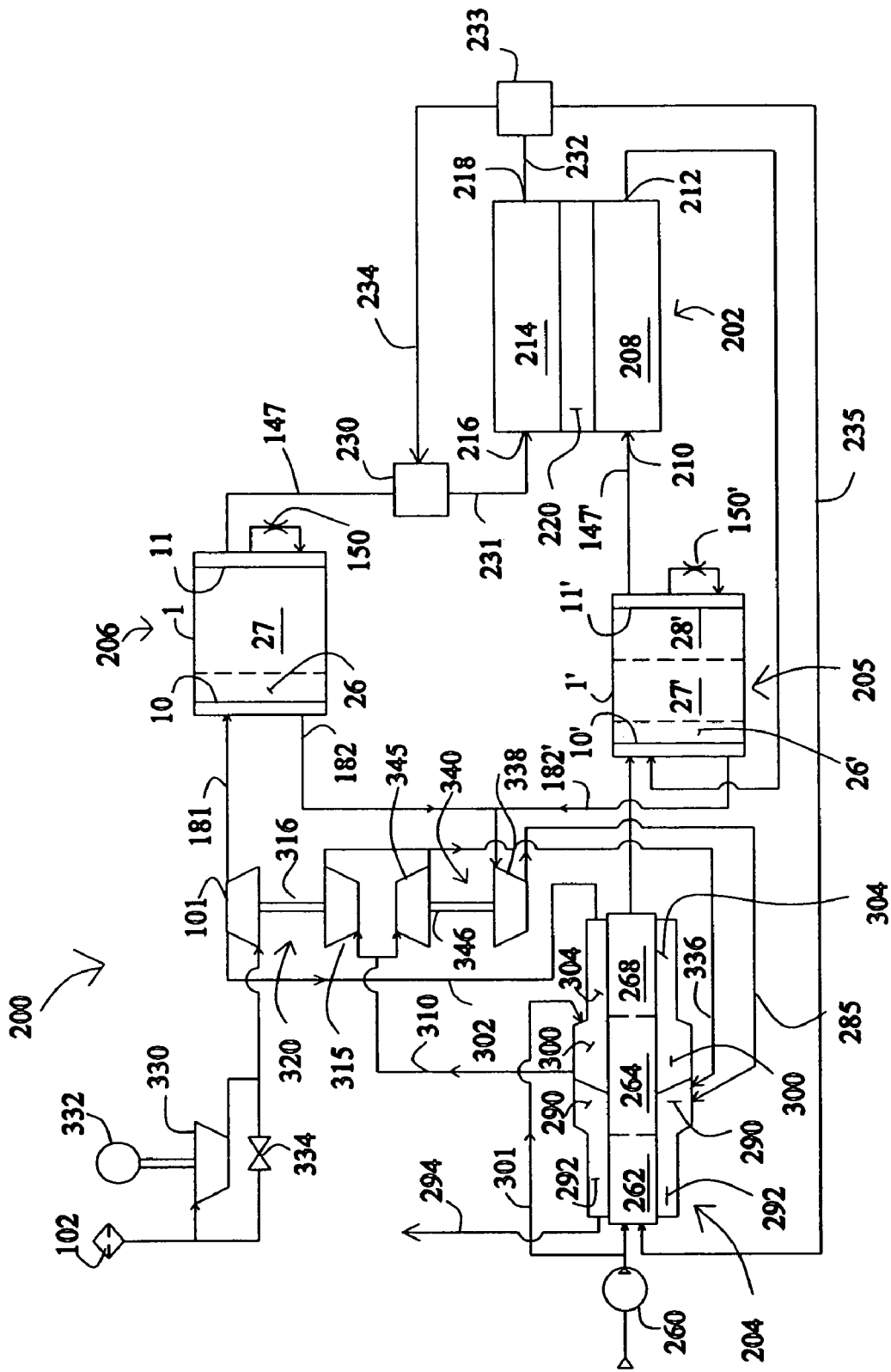
FIG. 8 is a simplified schematic of another embodiment of a fuel cell power plant that includes a vacuum pump.
Figure 9:
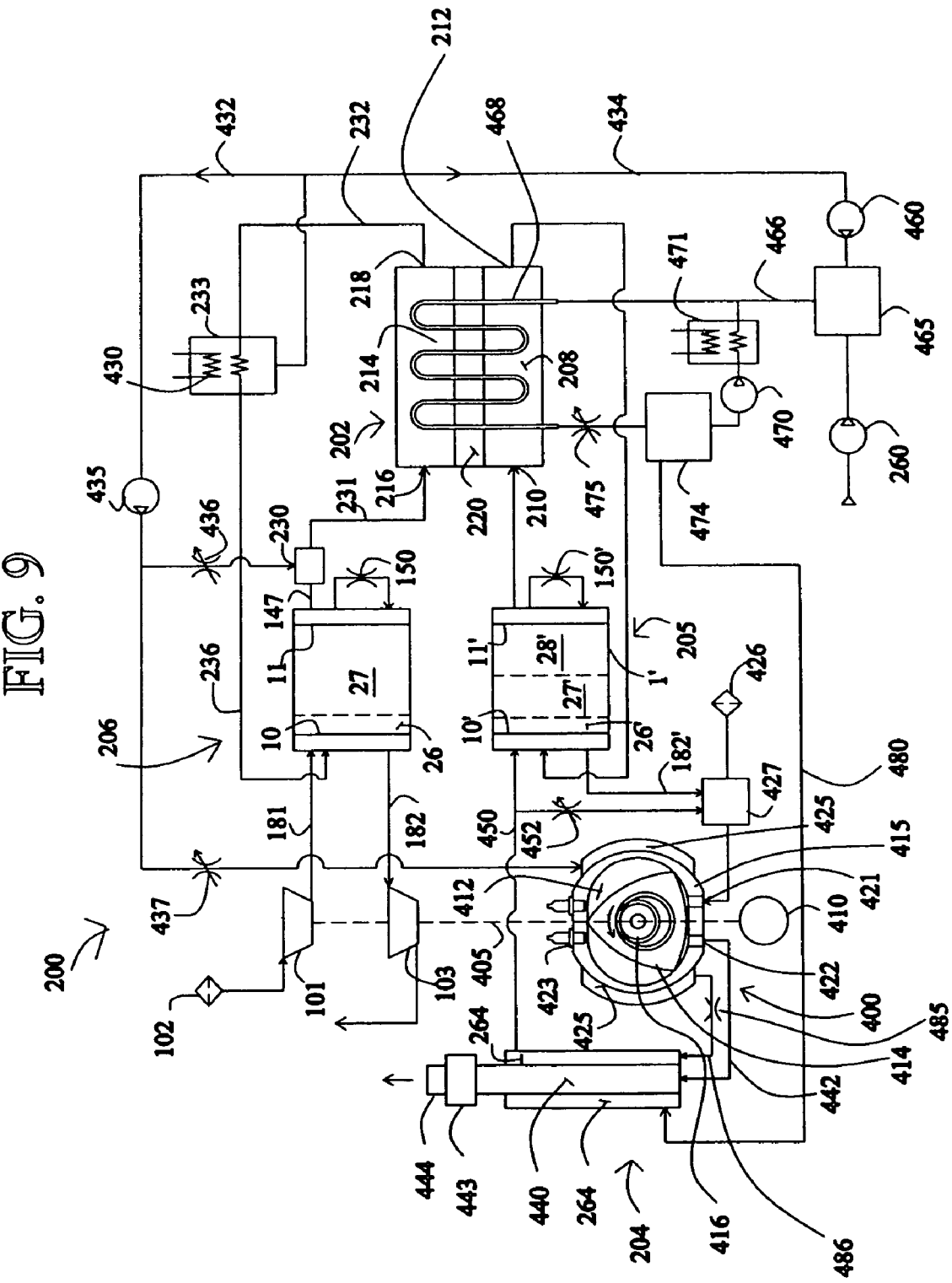
FIG. 9 is a simplified schematic of a further embodiment of a fuel cell power plant that includes an internal combustion engine and a modified fuel cell stack.

FIGS. 7-9 show a fuel cell power plant 200 that includes a fuel cell 202, a steam reforming fuel processor 204, a hydrogen purification PSA system 205, and an oxygen enrichment PSA or VPSA system 206. Fuel cell 202 comprises an anode channel 208 including an anode gas inlet 210 and an anode gas outlet 212, a cathode channel 214 including a cathode gas inlet 216 and a cathode gas outlet 218, and a PEM electrolyte membrane 220. Membrane 220 cooperates with the anode channel 208 and the cathode channel 214 to facilitate ion exchange between the anode channel 208 and the cathode channel 214.

The oxygen PSA or VPSA system 206 extracts oxygen gas from feed air, and comprises a PSA module 1, typically a rotary module 1, and a compressor 101 for delivering pressurized feed air to the feed compartments of the rotary module 1. Nitrogen enriched gas as heavy product gas from the blowdown and exhaust compartments of the rotary module 1 is withdrawn by conduit 182, either for discharge directly by atmosphere as in FIG. 7 or to a vacuum pump 103 for discharge as in FIG. 8. The adsorbers 3 of rotary module 1 have a first zone 26 loaded with a suitable desiccant, such as alumina gel, for substantial removal of water vapor, and a second zone 27 loaded with a nitrogen-selective zeolite. Dry oxygen enriched air as the light product gas of VPSA module 1 is delivered by conduit 147 to humidification chamber 230 and thence by conduit 231 to cathode inlet 216. A portion of the oxygen reacts with hydrogen ions when electric current is generated, to form water in the cathode. The cathode exhaust gas now containing a reduced amount of oxygen (but still typically oxygen-enriched well above ambient air composition) plus water is withdrawn from cathode exit 218 by conduit 232 to separator 233.

In FIGS. 7 and 8, a portion of the humid cathode exhaust gas (or water condensate) is removed from separator 233 by conduit 234, which transfers water and any recycle oxygen back to humidification chamber 230 for recirculation through cathode channel 214. Any oxygen recirculation through conduit 234 must be driven by appropriate recirculation pressure boost means, such as a blower or an ejector.

If fuel processor 204 in FIGS. 7 and 8 is a partial oxidation or autothermal reformer, the remaining oxygen (plus any accumulated argon and nitrogen) and the fuel cell product water are delivered from separator 233 by conduit 235 to the fuel processor 204. This delivery of cathode exhaust to the reformer provides enriched oxygen to assist the partial oxidation or autothermal reforming process, together with water product of the fuel cell as vapor and condensate, and also carries some fuel cell waste heat to assist in cooling the fuel cell stack while preheating reactants to the reformer. If fuel processor 204 in FIGS. 7 and 8 is a steam reforming reactor, the fuel cell product water condensate is delivered from separator 233 by conduit 235 to the fuel processor 204. In that event, accumulations of argon and nitrogen in the cathode channel 214 can be recycled from separator 233 back to the oxygen PSA unit 1 as shown in FIG. 9 by conduit 236 to the first valve face 10 of PSA module 1 as a feed pressurization stream at an intermediate pressure below the higher pressure of the PSA cycle, or else purged to atmosphere.

A hydrocarbon fuel is supplied to the fuel processor 204 by a feed pump or compressor 260, combined with water from conduit 235, and vaporized and preheated in heat exchanger 262. The preheated stream of fuel and steam is then admitted to reforming catalytic chamber 264. In the example that the fuel is methane, the following steam reforming reactions take place, $$CH_4 + H_2O \rightarrow CO + 3H_2$$

$$CH_4 + 2H_2O \rightarrow CO_2 + 4H_2$$

in addition to partial combustion in the case of an autothermal reformer:

$$CH_4 + 1/2O_2 \rightarrow CO + 2H_2$$

The resulting reformate or "syngas" (dry composition approximately 70% $H_2$ with roughly equal amounts of CO and $CO_2$ as major impurities, and unreacted $CH_4$ and $N_2$ as minor impurities) is cooled to about 250° C., and then passed to the water gas shift reaction zone 268 for reacting most of the CO with steam to produce more $H_2$ and $CO_2$:

$$CO + H_2O \rightarrow CO_2 + H_2$$

The hydrogen rich reformate still contains about 1% to 2% CO after water gas shift, along with substantial amounts of carbon dioxide and water vapor. For high performance and longevity of a PEM fuel cell, it CO concentration should be reduced well below 100 ppm and preferably below 10 ppm. Consequently, the impure reformate is admitted by conduit 270 to the higher pressure feed port of hydrogen PSA unit 205, including rotary PSA module 1'. As described above, the adsorbers 3' of rotary module 1' have a first zone 26' loaded with a suitable desiccant, such as alumina gel, for substantial removal of water vapor, a second zone 27' loaded with an adsorbent selective for CO removal, and at least partial bulk removal of $CO_2$, and a third zone 28' loaded with an adsorbent suitable for further removal of residual CO and at least partial removal of other impurities, such as $N_2$.

Purified hydrogen light product from the hydrogen PSA module 1' is delivered by conduit 147' to anode inlet 210, passed through anode channel 208, and then exhausted from anode exit 217 back to a feed pressurization compartment in the first valve surface 10' of hydrogen PSA module 1'. This system retains hydrogen within the fuel cell anode loop, including conduits 147' and 280, and anode channel 208, while using the hydrogen PSA unit 1' to reject impurities that otherwise would accumulate on the anode 208.

Exhaust second product gas from the hydrogen PSA module 1' contains water vapor, $CO_2$, and combustible values including $H_2$, CO and any unreacted fuel from the reformer. This gas is exhausted from valve face 10' by conduit 285 to low pressure burner 290, where this fuel is oxidized completely, possibly over a suitable catalyst to ensure stable combustion of this low BTU gas and to suppress NOx formation. Burner 290 delivers hot products of combustion to heat exchange channel 292, which is in countercurrent thermal contact for heat recovery to reformer reactor zone 264 and preheater zone 262. After cooling in channel 292 and further cooling in heat exchanger 296, the flue gas from burner 290 is discharged to atmosphere by exhaust conduit 294.

The hydrogen PSA module purifies the hydrogen so as to remove essentially all contaminants deleterious to the fuel cell anode, including unreacted fuel components such as methanol, as well as incompletely reacted fuel components such as CO, and also other contaminants such as hydrogen sulphide and halogens that might originate with fuels such as landfill gas. The heating value of all such fuel byproduct impurities in the hydrogen is recovered by combustion of the PSA tail gas, to heat the fuel processor and/or an auxiliary thermal engine cycle powering auxiliary compression loads and possibly other mechanical loads. As methanol is harmful to PEM fuel cells, prior art methanol reformers for PEM fuel cells have been designed to achieve very high conversion to minimize methanol slip into the hydrogen-rich reformate gas, hence requiring a large catalyst inventory in a correspondingly large reactor vessel. The presently disclosed processes and systems allow methanol reformers to operate with relatively greater slip of methanol into the reformate gas (syngas), as that gas will be purified by the hydrogen PSA module to remove the methanol impurity from the hydrogen and deliver it to the hydrogen PSA tail gas for recovery of its heating value by useful combustion. Hence, a methanol reformer can advantageously be designed to operate at less high necessary conversion of methanol, thus reducing the required methanol reforming catalyst inventory and reactor vessel size.

Fuel processor 204 is also thermally integrated with a high pressure burner 300, to which a portion of the fuel from fuel pump 260 may be introduced by conduit 301. Compressed air is supplied to burner 300 from feed compressor 101 through conduit 302, heat exchanger 296 (for recuperative heat exchange from exhaust flue gas) and heat exchange channel 304, which is in countercurrent thermal contact for heat recovery from water gas shift reaction zone 268 and reformer reactor zone 264 if the reforming reaction includes partial oxidation for net exothermicity. Hot products of combustion [including nitrogen and unreacted oxygen] from combustion chamber 300 are conveyed by conduit 310 to expander turbine 315, coupled by shaft 316 to compressor 101. The combination of compressor 101 and expander 315 are shown as a free rotor turbocompressor 320, similar to an automotive turbocharger. Alternatively a drive motor or a generator may be coupled to shaft 316, for starting, power assist, or net energy delivery. In FIGS. 7 and 8, a blower 330 driven by motor 332 is provided to boost the inlet pressure to compressor 101, if desired to assist the compression of feed air in normal operation, but typically only as a starting device to initiate rotation of turbocompressor 320, in which case bypass valve 334 is opened during normal operation after starting.

The still hot gas discharged by expander 315 is discharged by conduit 336 to low pressure burner 290, providing heat and oxygen to support catalytic combustion therein. Supplemental air or oxygen may be provided to low pressure burner 290 if required during starting or any phase of normal operation.

While FIG. 7 shows an embodiment whose lower working pressure is atmospheric, FIG. 8 shows an embodiment with vacuum applied to the oxygen and hydrogen PSA units to improve their performance, perhaps to enable a reduced working pressure of the fuel cell. Of course, separate vacuum pumps could be provided for each of the oxygen and hydrogen PSA units. Vacuum pump 338 receives the second product exhaust gases at subatmospheric pressure from both the oxygen PSA 1 and the hydrogen PSA 1' by respectively conduits 182 and 182', and delivers the combined stream to the catalytic low pressure burner 290 by conduit 285. Vacuum pump 338 is provided as a turbocompressor 340 with expander 345 driving pump 338 through shaft 346. Expander 345 is arranged in parallel or series with expander 315 to expand hot gas delivered by conduit 310 from high pressure burner 300.

The combustion turbine embodiments for powering auxiliary compression machinery have the important advantage of using readily available and low cost turbocharger equipment. FIG. 9 shows an alternative embodiment using a rotary internal combustion engine 400 to power the compressor 101 and optional vacuum pump 103 of the oxygen PSA 206 by shaft coupling 405, while itself providing vacuum suction if desired for the hydrogen PSA 205. The engine 400 may also power any other compressors or vacuum pumps that may be provided for the hydrogen PSA 205 as well as any auxiliary devices such as an electric generator. Engine 400 is fuelled, at least in part, by hydrogen PSA tail gas, and has a starter motor 410 (or supplemental power output generator 410).

Engine 400 may be any type of combustion engine such as an internal combustion engine or a combustion-enhanced turbocharger, but is here shown as a Wankel engine. Working chambers 412 are defined between rotor 414 and casing 415. The rotor is coupled to drive shaft 405 by internal gear 416. An intake port 421, exhaust port 422 and spark plugs 423 are provided in casing 415. A water cooling jacket 425 is provided. The engine has an air filter 426 delivering air to carburetor 427, and to intake port 421. The carburetor mixes the air with hydrogen PSA exhaust gas delivered by exhaust conduit 182' to carburetor 427.

FIG. 9 shows details of an illustrative water management system. Product water of fuel cell 202 is captured in separator 233 that includes a cooling coil 430, and is delivered to liquid water manifold 432. A portion of the water may be delivered from manifold 432 to pump 435, and thence by flow control 436 to the oxygen humidification chamber 230 and by flow control 437 to engine cooling jacket 425. Hot water from the engine cooling jacket is flash evaporated and delivered through depressurization orifice 485 and conduit 486 to methanol reforming reactor catalyst zone 264, which in turn is in heat exchange contact with the engine exhaust in channel 440. Engine exhaust is delivered from exhaust port 422 via conduit 442 to channel 440 for exhaust heat recovery to the endothermic methanol vapor phase reforming reaction in reactor zone 264, and then through emission control aftertreatment catalyst 443 and exhaust pipe 444 to atmosphere.

Reformate hydrogen is delivered from reactor zone 264 by conduit 450 to feed hydrogen PSA unit 205. A portion of the reformate may be diverted to carburetor 427 from conduit 450 by flow control 452 as supplemental fuel for engine 400.

A portion of the water condensate from separator 233 may be delivered via conduit 434 by pump 460 to liquid fuel mixing chamber 465, which also receives liquid methanol fuel delivered by fuel pump 260. The flow rates of pumps 260 and 460 are adjusted to achieve a desired concentration ratio of the water/methanol mixture exiting the mixing chamber 465 by conduit 466 delivering this mixture as fuel cell stack coolant circulated through cooling passage 468 through the fuel cell stack 202. The coolant pressure is maintained high enough to maintain it in the liquid phase within the cooling passage. The methanol present in the mixture may provide useful antifreeze properties to the coolant mixture. A portion of the water/methanol mixture coolant exiting cooling passage 468 is flash evaporated in separator 474 by depressurization valve 475 to approximately the working pressure of reforming reactor zone 264, and the resulting vapor mixture is delivered by conduit 480 to the reforming reactor catalytic zone 264. The balance of the water/methanol mixture coolant is repressurized and recirculated by pump 470 through cooling radiator 471 to reject fuel cell stack heat that has not been recovered to vaporize the water and methanol reactants. Alternatively, a water/methanol mixture could be delivered to the engine cooling jacket 425, vaporized, and then delivered to a reforming reactor.

If desired, the recovered water from the fuel cell could be delivered to only the cooling passage 468 or engine cooling jacket 425. Alternatively, water from an outside source could be delivered to cooling passage 468 and mixed with hydrocarbon fuel or water from an outside source could be delivered to the engine cooling jacket 425.

Alternatively, the embodiment of FIG. 9 may be adapted so that steam reforming of methanol vapor is conducted in the hydrogen PSA unit 205. The methanol reforming reaction zone as described above may be removed from channel 264 to the second zone 27' of the hydrogen PSA unit 205. Channel 264 being heated by engine exhaust in channel 440 is used only to preheat the reactant mixture of methanol vapor and steam. In the hydrogen PSA unit 205, first zone 26' contains an adsorbent selective for carbon dioxide in the presence of steam and methanol vapor, e.g. promoted hydrotalcite at a working temperature of the first zone at about 300° to 450° C. Second zone 27' contains the methanol reforming catalyst, e.g. Cu—ZnO, which is also active for water gas shift, at a working temperature of about 150° to 300° C. The third zone 28' contains an adsorbent selective for steam and methanol vapor, e.g. alumina, 13X or a hydrophobic zeolite such as Y zeolite or silicalite, at a working temperature of about 150° to 80° C. A hydrophobic adsorbent can be more selective for methanol vapor than water vapor, thus ensuring that a sufficiently high steam/methanol ratio is maintained throughout the reaction zone, and also perhaps allowing some slip of water to humidify the hydrogen product.

Accordingly, essentially 100% conversion and selectivity (equivalent to substantially complete removal of CO) are achieved in the reaction of steam methanol reforming:

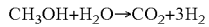

$$CH_3OH+H_2O \rightarrow CO_2+3H_2$$

The systems shown in FIGS. 6-9 are only examples and other systems with difference arrangements of devices and conduits, or with additional or fewer devices and conduits could also be used.

We claim:

1. An electrical current generating system comprising:
 a hydrogen-containing gas source comprising a reformer or partial oxidation reactor, wherein the reformer or partial oxidation reactor comprises a first burner and a second burner;
 at least one adsorption module that can at least partially purify the hydrogen-containing gas, wherein the adsorption module includes at least a first adsorbent and at least one second material selected from a second adsorbent, a steam reforming catalyst, or a water gas shift reaction catalyst, the first adsorbent and the second adsorbent being chemically distinct;
 at least one fuel cell defining an anode inlet that can receive the purified hydrogen-containing gas stream from the adsorption module; and
 a turbocompressor that includes an expander,
 wherein the first burner receives an exhaust gas from the adsorption module, the second burner receives a hydrocarbon fuel feed, and the expander receives a combustion gas from the second burner.

2. The system of claim 1, wherein the turbocompressor includes a feed air compressor powered by the expander.

3. The system of claim 1, further comprising a pressure swing adsorption module configured to produce an oxygen-enriched gas stream, wherein the turbocompressor further includes a vacuum pump powered by the expander and the vacuum pump cooperates with the pressure swing adsorption module configured to produce an oxygen-enriched gas stream.

4. The system of claim 2, further comprising a blower coupled to the feed air compressor.

* * * * *